United States Patent
Bell et al.

(10) Patent No.: US 8,795,084 B2
(45) Date of Patent: Aug. 5, 2014

(54) LOCATION-BASED MULTIPLAYER GAMING PLATFORM

(76) Inventors: Jason S Bell, Venice, CA (US); Thomas H. Parry, Los Angeles, CA (US); Frederick W. Ernst, Los Angeles, CA (US); Brian Andrew Gomez, Moorpark, CA (US)

( * ) Notice: Subject to any disclaimer, the term of this patent is extended or adjusted under 35 U.S.C. 154(b) by 1014 days.

(21) Appl. No.: 12/049,464

(22) Filed: Mar. 17, 2008

(65) Prior Publication Data

US 2009/0017913 A1    Jan. 15, 2009

Related U.S. Application Data

(60) Provisional application No. 60/895,323, filed on Mar. 16, 2007, provisional application No. 60/944,575, filed on Jun. 18, 2007.

(51) Int. Cl.
*A63F 9/24* (2006.01)
*G06F 19/00* (2011.01)

(52) U.S. Cl.
USPC ......... 463/42; 463/9; 463/29; 463/40; 463/41

(58) Field of Classification Search
USPC ........................... 463/7, 9, 29, 40–42
See application file for complete search history.

(56) References Cited

U.S. PATENT DOCUMENTS

| | | | | |
|---|---|---|---|---|
| 4,569,528 | A * | 2/1986 | Fanti | 273/267 |
| 5,971,854 | A * | 10/1999 | Pearson et al. | 463/41 |
| 6,932,698 | B2 * | 8/2005 | Sprogis | 463/9 |
| 2004/0077423 | A1 * | 4/2004 | Weston et al. | 472/137 |
| 2005/0070360 | A1 * | 3/2005 | McEachen et al. | 463/42 |
| 2006/0017612 | A1 * | 1/2006 | Nagatani | 342/357.07 |
| 2007/0167224 | A1 * | 7/2007 | Sprogis | 463/29 |

* cited by examiner

*Primary Examiner* — Werner Garner

(57) ABSTRACT

The methods and systems disclosed herein include a gaming platform that may support massively-multiplayer online computer games, with elements of social networking, in which players may use mobile devices in order to verify their location and claim a measure of control over the location. Players may function like game pieces in association with other members on a team and participate in competitions to capture and defend real-world territory as part of the gaming experience. The gaming platform and associated entities may share revenue and other incentives with entities associated with the locations controlled by the players on the game platform.

7 Claims, 12 Drawing Sheets

LOCATION-BASED MULTIPLAYER GAMING PLATFORM

CROSS-REFERENCE TO RELATED APPLICATIONS

This application claims the benefit of the following commonly-owned U.S. Provisional Patent Applications, each of which is incorporated herein by reference in its entirety: U.S. Prov. App. No. 60/895,323 filed on Mar. 16, 2007; and U.S. Prov. App. No. 60/944,575 filed on Jun. 18, 2007.

BACKGROUND

1. Field

This invention relates to electronic commerce, and more particularly to the combination of online gaming activity with offline behavior of game participants.

2. Description of Related Art

Search engines and click-through online advertising have revolutionized how retailers market to potential customers. Yet, while shopping online has become more popular, consumers, for the foreseeable future, will continue to patronize brick and mortar retail outlets.

Up to 100 million Americans (and even more worldwide) play online casual games. Overwhelmingly these are single-player experiences, yet gaming is historically a social activity that provides participants with dynamic interpersonal activity. Currently, large-scale, community-based, online computer games like World of Warcraft are designed to attract so-called "hard-core gamers" and can be played by thousands of people simultaneously and deliver a powerful social experience. Yet these massively-multiplayer games are not particularly attractive for the casual gamer, because they require an enormous investment of time and skill.

Social networking websites like MySpace and Facebook have recently become popular by offering a way for Internet users to socialize in an engrossing way. But few, if any, have yet to make money commensurate with their massive customer base.

Cell phones are increasingly offering more features above and beyond basic phone service such as e-mail, text messaging, location-based services and games. And while cell phone gaming has become more popular, few offer the ability to play with others and socialize. And while virtually most subscribers have access to location-based services, the sector has yet to take off.

Therefore, there is a need for a gaming platform that may enable retailers to take advantage of current mobile communication technologies to drive consumers to their physical store locations, based at least in part on a massively-multiplayer online computer gaming platform, with elements of social networking, in which people and their cell phones are the game pieces in team competitions to capture and defend real-world territory as part of the gaming experience.

SUMMARY

Methods and systems are provided herein for a multiplayer online computer gaming platform, with elements of social networking, in which people and their cell phones are the game pieces in team competitions to capture and defend real-world territory as part of the gaming experience. In embodiments, the present invention provides a method and system for associating a geographic location with a code, transmitting the code using a mobile communication facility, verifying the code transmission receipt at a geographic location using a location verification facility located at the geographic location, and broadcasting the verification to a network.

In embodiments, upon broadcasting of the verification, a measure is awarded based on the verification. A measure may be a location control measure of a multiplayer game. A location control measure may be based at least in part on a distance of the mobile communication facility from the geographic location at the time of the code transmission. A location control measure may be based at least in part on a criterion. A criterion may be a purchase at a geographic location, a visit duration at a geographic location by a player, a fee payment made by a player, a receipt of a sponsor code transmission, or some other criterion. A sponsor code may include a coupon code, proof-of-purchase code, or some other type of sponsor code. In embodiments, a measure may be a territory control measure of a multiplayer game.

In embodiments, the verification may be broadcast to a plurality of mobile communication facility users. The verification control facility may use a local wireless network to identify a mobile communication facility of a user that is in proximity to the geographic location.

In embodiments, the game platform may be able to identify whether the mobile communication facility is present at the geographic location near the time of entering the code.

In embodiments, a geographic location may be a virtual geographic location, a retail store, a landmark, a location defined by a mobile communication facility user, a ground level location, a subterranean location, an above ground level location, or some other location.

In embodiments, the geographic location of a mobile communication facility may be established using triangulation, GPS, geocoding, human verification of location, or some other location finding or verification technology. In embodiments, a code may be associated with a game scenario or a plurality of game scenarios.

In embodiments, a code may be transmitted by calling a phone number, sending an SMS or some other form of text message, using a website or some other means of transmission. In embodiments, transmission of a code may invoke a fee to a player or team that is sending the code. A code transmission fee may be billed to the account associated with the mobile communication facility from which the code is transmitted. In embodiments, a code transmission receipt may be confirmed to the mobile communication facility.

In embodiments, a broadcast may be made using the Internet, a webpage update, a social networking site, an email, a text message, a wireless provider, a voice mail, an automated voice mail, a wireless provider and the Internet in combination, an interactive user interface, or some other broadcast means. A broadcast may invoke a fee. An automated voice mail may be created by a user of the mobile communication facility gaining location control of the geographic location. An interactive user interface may include a map. A map may be a satellite image, a graphic rendering, a three-dimensional map. An interactive interface may include a blog, sponsored content, or some other type of content. Sponsored content may be associated with the geographic location.

In embodiments, the present invention may enable creating a code that may be entered in a mobile communication facility, associating the code with a unit of a location verification facility that may be further associated with one or more of a plurality of geographic locations, establishing a geographic location of the mobile communication facility, transmitting the code from the mobile communication facility, computing with the verification facility a location verification measure associated with the geographic location and the mobile communication facility, and broadcasting the measure to a network.

In embodiments, the present invention may enable associating a mobile communication facility with a plurality of mobile communication facilities, wherein the association forms a multiplayer team, associating a code with a geographic location, transmitting the code using the mobile communication facility, identifying whether the mobile communication facility is present at the geographic location near the time of entering the code, and creating a first multiplayer team score based at least in part on verifying that the mobile communication facility is present at the geographic location near the time of the code transmission.

In embodiments, a first multiplayer team score may be aggregated with a second multiplayer team score from a second code transmission, or plurality of multiplayer team scores from a plurality of code transmissions. Code transmissions, and the multiplayer team scores on which they are based, may derive from a single mobile communication facility visiting multiple locations, a single mobile communication facility visiting a single location more than once, a plurality of mobile communications visiting the same location, or a plurality of mobile communication facilities visiting a plurality of locations.

In embodiments, an aggregated multiplayer team score may be weighted based on a criterion. A criterion may be a purchase at a geographic location, a visit duration at a geographic location by a player, a fee payment made by a player, a receipt of a sponsor code transmission, or some other criterion. A sponsor code may include a coupon code, proof-of-purchase code, or some other type of sponsor code. In embodiments, a measure may be a territory control measure of a multiplayer game.

In embodiments, an aggregated multiplayer team score may be converted into a weighting of a multiplayer team's location control measure. A weighting of the multiplayer team's location control measure may diminish as a function of time. The diminution of the weighting of the multiplayer team's location control measure may be halted upon receipt of a third code transmission by at least one of a plurality of players' mobile communication facilities.

In embodiments, a multiplayer team's location control measure may be broadcast to a plurality of multiplayer teams.

In embodiments, an association of a player's mobile communication facility with the plurality of mobile communication facilities may be made using the Internet, a wireless provider, or some other means of communication. The association may form a team.

In embodiments, the present invention may enable creating a first code associated with a first location, a second code associated with a second location, and a third code associated with a third location, lines among the three locations defining a perimeter of a geographic territory, transmitting the first, second, and third codes using at least one mobile communication facility, verifying location of the mobile communication facility upon receipt of the codes' transmissions, and upon verification of at least three codes, awarding a territory control measure for the geographic territory to an entity associated with the mobile communication facility.

In embodiments, a rival location control that is associated with a location within a geographic territory may be eliminated upon awarding territory control. The rival location control may be associated with a rival mobile communication facility in competition for location control with the mobile communication facility.

In embodiments, the present invention may enable associating a code with a geographic location, tracking a transaction at the geographic location and associating the code with the transaction upon verification of a user's presence at the geographic location, calculating a revenue associated with the transaction, awarding a location control measure based on the code and the transaction, and receiving a share of the revenue associated with the transaction.

In embodiments, a share of revenue derived from a sponsor, location, code transmission, or the like, may be retained by the gaming platform and/or entities associated with the platform.

In embodiments, a code associated with a geographic location may be automatically sent for a player or team.

In embodiments, a player or team may be provided an incentive upon receipt of the transmitted code. An incentive may be a coupon or some other incentive.

In embodiments, a transaction may be a webpage view, an online advertisement conversion, an online transaction, an online survey completion, a visit to a geographic store location, a purchase at a geographic store location, a club enrollment, a credit card enrollment, a credit card purchase, a phone call, a text message, a viewing of television content, or some other transaction type.

In embodiments, a code may be transmitted using a mobile communication facility, a telecommunications land line, the Internet, email, ground mail, a television, a fax, or some other means of transmission.

In embodiments, revenue may derive from advertising, a purchase or transaction, a sponsorship, a subscription, or some other means of revenue creation.

These and other systems, methods, objects, features, and advantages of the present invention will be apparent to those skilled in the art from the following detailed description of the preferred embodiment and the drawings.

BRIEF DESCRIPTION OF THE FIGURES

The invention and the following detailed description of certain embodiments thereof may be understood by reference to the following figures.

DETAILED DESCRIPTION

Figure 1:
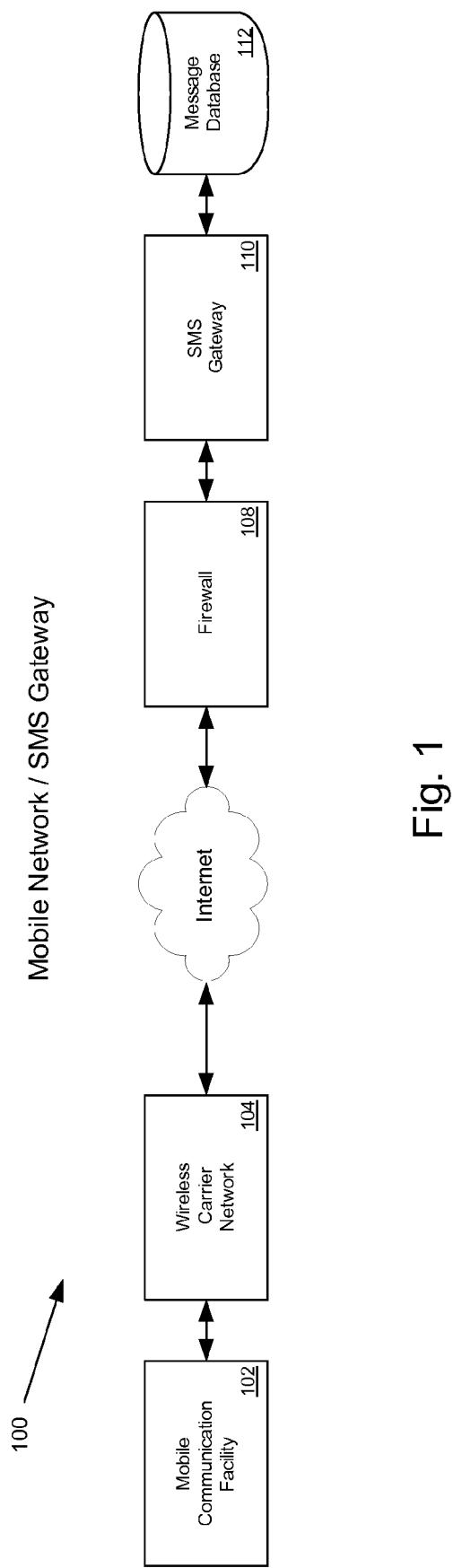
FIG. 1 illustrates a simplified mobile network/SMS gateway.

An aspect of the present invention includes a location-based, massively-multiplayer, community-building, real-world cellular gaming platform that uses people and their cell phones as game pieces in team competitions to capture and defend real-world territory—all displayed on thousands of web pages. Game play may deliver customers to retail, bricks and mortar clients, turning click-throughs into walk-ins to physical store locations. The method and systems of the present invention include a game that may be played with a cell phone, or some mobile device with location-based capabilities, such as GPS, triangulation, and the like. The game may utilize the Internet for communication, organization and to create a gaming social community. Revenue may be derived from web page advertising, sponsorships, premium subscriptions, and retail revenue sharing. In embodiments, the game may be an adaptable game platform, based on a simple rule-set similar to Risk or Capture the Flag, and aimed at a mass audience of tens of millions of casual Internet game players and the even larger population of two billion-plus cell phone users, both domestically and abroad.

In embodiments, the gaming platform may utilize the real world as the game board, with players moving through this space capturing territory by using their cell phones as the game controllers. Rather than delivering single game graphics to the small screens of cell phones, in embodiments of the present invention the phone may be used to confirm a player's location on the game board, via already existing and ubiquitous cellular location-based technology. Graphics, team and individual identities and community tools and rankings may be delivered over the Internet on game webpages that track each contest's constantly evolving progress and status in real time.

In embodiments, game play may include teams that compete for "nodes," which are real world locations that can range from retail stores to rock concerts. Team members enter a code into their cell phone to capture a Node. Captured Nodes are then linked to define a territory controlled by the team—with the winning team owning the most territory at the end of the game. Any location or event can become a Node, and games can be tailored for duration—a few days to many months. Games may scale seamlessly from local to global play, and territories may be displayed on contest Web pages in real time. Team-owned spaces may decay over time and may be attacked by other teams through a variety of tactics, including repeated incursion and surrounding by an opposing team.

In embodiments, the competition results may be sharable, for example on a website posting a leader board. Game play may also us coupons and personalized purchase opportunities to create player affinity and incentives for playing the game. Game play may also provide a reason for community members to meet face-to-face.

In embodiments, the gaming platform may provide links between online game play and accomplishment by associating game play with tangible real world benefits and rewards by making brick and mortar retail locations part of game play. Furthermore, by actually delivering customers to retail locations in a provable and auditable way, the game may provide incentives for retailers to offer prizes and sponsor contests. Through the game experience, a cell phone may become a nonintrusive means of matching local business offerings with user needs.

In embodiments, the game may be customized, and the game Nodes or play locations may be any store, location, or landmark. The game may be tailored to appeal to any geographic theater or demographic. In other words, according to the methods and systems described herein, games may be created, with or without sponsors, for teen boys in Los Angeles, "tween" girls in Singapore, or single adult females in London, Seoul, or Shanghai, or any other demographic group or geographic location.

In embodiments, the gaming platform may benefit from a wide range of revenue streams owing to its combination of sponsorships, venues, and game play elements. Depending on the location, player population, and design of the game, the game may tailor its business model and revenue flow per game, per site, and per demographic—allowing a level of flexibility and adaptability that may diversify and minimize risk while maximizing customer satisfaction, repeat play, and customer loyalty and predictability. In an example, when a player participant in the game visits a retail partner in the course of capturing a node, the game operators may receive a bounty for delivering the customer to the store, as well as participating in revenue sharing from any purchase resulting from the player's store visit.

In embodiments, the gaming platform may be free to play. In embodiments, the game may be a premium game, available via a subscription fee. In embodiments, winning players in the game may be rewarded. In embodiments, winning teams may be rewarded. A reward may include, but is not limited to, money, merchandise, store credits, coupons, or some other incentive or reward.

In embodiments, the gaming platform may be a custom-designed private game for a corporate client, person, event, occasion, or some other defining characteristic.

In embodiments, the gaming platform may generate revenue for an operator by virtue of the traffic through the thousands and tens-of-thousands of game and team web pages linked through a game operator website as players check on the status of their games and socialize and coordinate with their friends and fellow players. Such an operator website may sell advertisements for inclusion on the game-related webpages used by the players.

In embodiments, the game players may have the opportunity to purchase game-enhancing power-ups for themselves or their teammates, as well as numerous customizations for their personal and team pages.

In embodiments, the game is a scalable set of games. A game may be, instead of a single game, a gaming platform that hosts a virtually unlimited number of different games, some with different fictive wrappers, which target different audiences and different facets of the marketplace. Moreover, each "layering" of games may be tailored to each individual geographic location according the national tastes, motivations, and real-world sponsor and other partnerships negotiated for each region.

In embodiments, the gaming platform may include a set of tools to allow players to create and run their own games in addition to the in-house games that designers may build. The game platform may require that player-generated content use a certain percentage of retail partner nodes, this combined amount of content may, in effect, allow retail partners to conduct real-time market research. Moreover, game traffic patterns may help establish what works best for each market and location, determining direction and focus for continual development and marketing of the game platform's sponsored, revenue generating content. In an example, a retail book store may have a book-signing in New York and want a large crowd at the event in order to create buzz for the launch. Using the game platform, it may be possible to create a real-time, special benefit for those game players that visit the store and narrowcast this in-game promotion to New Yorkers who have, for example, indicated an interest in books.

In embodiments, the gaming platform content, such as game titles, concept, web graphics, and sponsor-sets, may be customized and marketed to individual marketplaces, retailers, or some other commercial entity.

In embodiments, the gaming platform may use a set of databases. These databases may be designed to log and track millions of unique customer attributes and call up situation-specific graphics from multiple "libraries" in real time, so that the individual user sees only their specific "world"—for example, the game that they have agreed to play in, or have even created themselves. Such an infrastructure may permit the gaming platform to handle the requirements of running tens-of-thousands of simultaneous games for millions of players in thousands of locations internationally.

In embodiments, the gaming platform may be differentiated from the traditional "causal gaming." The term "casual games" is used to describe games that are easy to learn, utilize simple controls and aspire to forgiving game-play, but perhaps are best portrayed as games targeted at a mass audience. Casual games usually have a few simple rules and an engaging game design, making it easy for a new player to begin playing the game in just minutes. And they require no long-term time commitment or special skills to play. Common features of casual games include simple game-play in short bursts, with the ability to quickly reach a final stage, or continuous play with no need to save the game, and no plot or character, or simple ones with no bearing on the game's mechanics. Casual games reach virtually all demographic sectors. Women in their forties comprise the typical casual game player—but so do men, teens, kids, college students, seniors and international audiences. Even hard-core game players take a break every now and then to play free online poker games and online pool. More people from around the world play casual games than any other kind of video game. Overwhelmingly, however, casual games are limited to a single-player experience, yet gaming is historically a social activity that provides participants with dynamic interpersonal activity. Currently, large-scale, community-based, online computer games (Massively-Multiplayer Online Games or MMOGs) like Ultima Online, EverQuest, Asheron's Call, and World of Warcraft (at 8 million online subscribers worldwide and growing) are designed to attract so-called "hard-core gamers" and can be played by thousands of people simultaneously. Yet these games are not particularly attractive for the casual gamer since they require an enormous investment of time and skill.

In embodiments, the gaming platform may support a massively-multiplayer, online computer game specifically designed for casual gamers. In embodiments, the gaming platform may provide elements of a social network functionality to correspond to the gaming aspects. The gaming platform may foster a community—a self-identified, active, and persistent group of like-minded or commonly motivated individuals—has existed online since the early days of the Internet. In embodiments, the gaming platform may create a social networking and community site for casual users.

In embodiments, the location-based services and capabilities of mobile communication devices, like cell phones, may be used by the gaming platform, for example, access to mobile maps, driving directions, and the like. The gaming platform may support a massively-multiplayer, casual game played in the real word, where players and their cell phones are the game pieces in a team competition for territorial control. A game may be played with a cell phone, but unlike traditional mobile phone games where the player interacts with the game through a pad of tiny buttons and watches the game world on a screen, a game according to the gaming platform methods and systems may be played within the real world where the players' phones are their game controllers.

In embodiments, the gaming platform may enable an ever-growing, always evolving society of players who come together to compete, cooperate, play and socialize, both in the real world and in an online community where the Internet is utilized for communication, organization and community. Players may monitor the game's progress on a gaming platform website where a game, in all its many iterations, along with teams and players, are displayed on thousands of web pages.

In embodiments, the gaming platform may turn any geographic location or plurality of geographic locations into an interactive game board. A player may create a game that incorporates a street in his neighborhood or a favorite haunt, and may gain notoriety for himself and his team within the social network of the gaming platform. Basic game-play may be free and may be paid for, in part, from retail revenue sharing by delivering players to the game platform's bricks and mortar clients—turning click-throughs into walk-ins. Additional revenue may be derived from web page advertising, sponsorships, premium subscriptions, or some other financial means.

In embodiments, the gaming platform may support games whose objective is to access territory and control the territory that is accessed. Teams of players may compete to control strategic locations, or "Nodes", in the real world to draw borders around territory that they can claim as their own. Players may vie for control of these Nodes through their cell phones, either through positioning systems such as GPS, triangulation, by texting location-specific codes via SMS, or by some other location-sensing technology. In an example, a game player may walk into a participating location (e.g., a coffee shop, fast food restaurant, video rental store) bring up the game application and press "Energize" within the game user interface. No other actions may be required to initiate game play. By performing this act, a player may stake a claim to that location for himself or his team. If an individual or team was successful, they will be notified via email, text message, phone call, or by some other communication means. A player or team of players may coordinate to make strategic moves that will capture large stretches of territory and cut off opposing teams from doing the same. Progress may be tracked through a gaming platform website and/or online community space. The gaming platform may also offer players the opportunity to purchase "power-up" enhancements that provide special abilities that may provide a competitive edge.

In embodiments, the gaming platform may support an online community. Each player may be given a personal home page where they may show off who they are and what they've done, in a manner similar to social networking sites. Players may be provided with tools to customize their personal webpage within the gaming platform's online community, for example, the background, the music that plays for visitors, the player's online avatar, or some other website characteristic. A player may also display their in-game achievements alongside their list of favorites (movies, bands, etc. . . . ) Through these personal pages, players may post messages, invites and endorsements. Players may also trade in-game virtual items such as power-ups or collectibles.

In embodiments, the gaming platform may players may track the progress of the game through a gaming platform website. Each game may have its own page displaying a dynamic 3-D map of the game. This map may update in real-time to show Nodes under attack, territory lost and gained and special events such as power-ups and team bonuses. In embodiments, a gaming platform website may include special effects, animation, soundtrack, or other features that are common to a conventional, modern video game.

In embodiments, the gaming platform may use a network of Nodes to make up the game world in which the game play may occur. These Nodes may be real-world locations, for example the retail locations of strategic partners of the gaming operators. Players may attempt to control these Nodes by visiting them and "Energizing" the Node via their mobile phones. Energizing a node may entail sending an SMS code generated by the retail location to the game server. In an alternate embodiment, those players with the latest location-enabled phones, may load the game and press the "Energize" button, and your location at the Node is logged on the game server, based at least in part on the phone transmitting its location information to the gaming platform. At the end of each round of game play (which may be hourly, or daily, or some other time duration) the "Energy" at each Node may be tallied and the team with the most Energy at the Node may take control of the Node. Once control of a Node has been achieved, "Links" may be drawn between the Node and other Nodes controlled by the same individual or team. These Links may be used to define a "Territory" that the individual or team controls, and to determine the points they are awarded. Once the Links are drawn and the Territories scored, the Energy at each Node may be cleared and a new round of competition begins.

In embodiments, the gaming platform may provide game variations on the basic gaming structure of energizing Nodes, capturing Territories, and earning rewards. In embodiments, games may scale from small games limited to a single city, to international competitions. Fast-paced games may be completed in a day or a weekend, or games may run for weeks and months. In embodiments, games may run continuously with no predefined end.

In embodiments, the gaming platform may be a universal game system that may be adapted and modified with variations and rules appropriate to a game fiction and an intended demographic. For example, in a pirate-themed game, the Nodes may become "Ports" and the Links become "Trade Routes." "Energizing a Node" may become "Plundering a Port," and a website map corresponding to the game and the game graphics may be filled with pirate paraphernalia, such as parrots, sabers, cannons, doubloons, and the like. Each player may become a captain of her virtual ship and she may visit an online store to "recruit" special items and virtual crew that will give her and her team an edge. In an alternate embodiment, a "Da Vinci Code" tie-in may be used in creating a game within the gaming platform. For example, players may visit nodes to collect cryptic clues and collaborate with their teammates to solve the puzzle before the other teams. In an alternate embodiment, in an "M:I3" themed game within the gaming platform, players may take on the role of secret agents working for the Impossible Mission team and defuse virtual "bombs" hidden at each node. Other embodiments of themed games may include, commercial product branding, Mr. Clean fights to clean (Energize) soiled locations in a city (Nodes) and create anti-bacterial zones (Territories), wherein the game winners are rewarded with Mr. Clean products, coupons, and the like.

In embodiments, the gaming platform may be designed to appeal to a wide range of players, though each may find different aspects of the game more engaging depending on their personality and play style. Dr. Richard Bartle, one of the pioneers of massively multiplayer online games, categorizes gamers into four distinct categories based on the aspects of a game that interest them most. "Achievers" tend to prefer collecting points, accolades, ranks and other rewards. They may do this to show dominance over other players, or simply for the reward of completing difficult challenges. "Explorers" enjoy exploring the game and game world, discovering all the secrets of the game's back story, characters and enemies. Knowledge of the game is often more important than success. "Killers" are driven by the rush they get from challenging human opponents and besting them. For these players fierce competition and "The Thrill of the Hunt" is everything. And, "Socializers" are drawn toward the elements of games that allow them to interact with other players. They enjoy creating and promoting organizations and finding cooperative solutions to game challenges. Though few players are defined by a single play style, a game that does not appeal to a player's preferred style will have a harder time keeping that individual's interest. The gaming platform is designed so that there are elements of the game that may appeal strongly to each of the four play styles. For example, for Achievers there may be accolades and awards for a wide variety of game actions. In an example, players may be ranked on the number of Nodes Energized, Nodes Captured, Links Made and Territory Held. Leader boards may be maintained for each game, individual and/or team so that players can see how they stack up against other players and their own team-mates. Power-ups and titles may be awarded to individuals for exceptional game-play such as quickly capturing a large number of Nodes. Explorers may be drawn to discover all of the secret nodes, hidden power-ups and special locations that a given game has to offer. Some games may be geared heavily toward exploration, but may include discoveries to be made and secrets to be uncovered. Killers may test their skills against other players and track their personal success rate. When a player uses a power-up to eliminate another players charge, or nullifies a player's territory with a well-placed capture, both players may receive a message to this effect so that the Killer can boast of his success and the Killer's target can begin to plot his revenge. Socializers may take the role of clan leaders and strategists. These players may coordinate their team's actions and pull off plays that will leave less organized teams wondering what hit them. These players may be the glue that keeps the gaming platform community together and may be responsible for the lion's share of user-run games and content.

In embodiments, the gaming platform may include Nodes that are the strategic locations that players compete to control during a game. Nodes may be real-world locations, such as branch locations of retail partners (Starbucks, McDonald's, FedEx Kinko's, etc.). Some games may include Nodes displayable on location-enabled phones that need not be tied to a retail partner. These Nodes may be selected for their theme or novelty value. (e.g., graveyards may be nodes in a horror themed game, or the Hollywood sign could be a Node in a city-centric game).

In embodiments, the gaming platform may include some games that have Nodes whose existence or locations are not initially revealed to the players. The location of these Nodes may be revealed through riddles, as rewards for challenges, through player exploration, by purchasing "maps" from the online store, or through some other means.

In embodiments, the gaming platform may enable players to vie for control of a Node by Energizing it. With a location-enabled phone, this may include being at the location and transmitting a code through the game application. Other phones may Energize a Node by texting an SMS code that is generated at the location. These codes may be generated by the retail partner's point-of-sale registers and printed on receipts from a sales or non-sales transaction. Energy Codes may be printed on receipts as a bar code that can be photographed by camera phone and transmitted to the game server. Bar codes printed on static media such as posters may enhance a transmission (by providing a power-up) by a location-enabled phone (and thereby minimize doubt that the player was actually inside the location). In embodiments, each Node may have a Window of opportunity that determines when it can be Energized. The duration and frequency of this Window may be adjusted to suit the requirements of the game or of the retail partner. For example, a leisurely-paced game may have a 24-hour window from midnight to midnight. At midnight the game server may tally the activity at each Node and award control of the Node to the team with the most Energy over the course of the day. In a more fast-paced game, that tally might happen every hour. Some Nodes may have their window limited to certain times a day. For example, a retail shop's Energy Window may be restricted to the hours that shop is open for business. A game in which Energy Windows are not in sync across all Nodes may offer very complex strategic possibilities.

For game play purposes Nodes may act as the "play spaces" of the virtual board in a plurality of games. Charging a Node is the means by which a player may make choices in game play and interact with the game. Charging the Node may be interpreted differently by each game, in some games representing an attempt to control the Node, while in others charging the node may be an attempt to uncover new game information, send a message, activate a power, launch a virtual weapon or construct a virtual building. From a system implementation aspect, the game system may determine which nodes should be energized. The game system may also determine how much each node should be energized and for how long. The game system may make this determination according to the rules of the game in play. The game system may invoke a method on the game server to record the change on each node that is energized. The game server may store this information in the game database.

In embodiments, it may be worthwhile for a team to control a single Node simply to deny another team control. However, if a team controls two or more Nodes during a given Window, Links will be created between them. Links belonging to opposing teams cannot cross one another, however. When two opposing links cross one another, the longer link is broken and cancelled.

In embodiments, territories may be a means of keeping score in the game. A Territory is a segment of the game area that is bound by Links created by a single team. The volume of ground within the shape created by the Links may determine the value of that Territory and thus the amount it adds to the controlling team's score. Territories cannot be created if an enemy Territory exists within it, but any Nodes that do not form a Territory may be lost if they are enclosed within an enemy Territory.

In embodiments, each Link may be assigned a Weakness value proportional to its length. Shorter Links are therefore stronger. When Links belonging to opposing teams cross, the weaker Link may be broken and eliminated. If both Links are created at the same time, the weaker Link is always the longer Link. However, Links may persist until they are broken or their Nodes controlled by an opposing team, but their weakness may increase by a set percentage with each passing Energy Window. This may make it possible for a longer Link to break a shorter Link if the latter has decayed and grown sufficiently weak.

In embodiments, once created, a Territory may take precedence over individual Nodes and Links (created subsequently) belonging to an enemy team that do not form a Territory. However, if a new Territory is created by an opposing team that includes Links that previously belonged to an enemy Territory, those Nodes and Links may go to the new team and the previously created Territory may be reduced or destroyed.

In embodiments, there may be a range of game play options envisioned beyond the core rules that will add variety and novelty to games. Also, players and teams may be able to purchase or win power-ups that will confer special abilities in the game.

In embodiments, numerous game-play variations are support by the gaming platform, including, but not limited to, "colony," "skullduggery," "burger chase," "motherload," or some other variation. In colony, the players are teams of aliens attempting to colonize and control the unsuspecting population of their local city. Each player picks a role such as Scout, Soldier or Queen that give them special powers in this game of territory (and mind-) control. In skullduggery, the players are pirates, traders and swashbucklers, their local "nodes" are ports of call and the links between them are hotly contested trade routes. Earn doubloons by shrewd trading or brazen piracy and add to your Nation/Team's coffers (and thus their score). In burger chase, a game well suited for sponsored special events, teams of players conduct a treasure hunt for delicious snacks. Taking control of Nodes helps a team zero in on the hidden burgers (virtual burgers, that is to say), which they then try to capture and return to a designated goal Node. In motherload, players are teams of Miners and the Nodes are potential mines rich in valuable ore. Linked Nodes form rich "veins" of ore that act as score multipliers. But watch out for the other teams or they will jump your claim.

In embodiments, the gaming platform players may derive real-world benefits for playing the game and building their online teams and associations. Since many of the games will be sponsored by real brick-and-mortar companies, each team will have a chance at the winner's prize. More important, however, are the promotions, sale notifications, and bonuses each player may receive for simply being part of the community. Because each player will need to enter a wealth of demographic information at sign-up and will demonstrate his or her commercial preferences by the types of real-world sites they choose to play at, advertisers may find it more than worthwhile to "lock-in" that player with special promotions and gaming platform-exclusive offers.

In embodiments, the gaming platform may drive customers to retail locations in a provable and auditable way, which may incentivize those commercial entities to offer coupons and prizes, and to sponsor contests.

In embodiments, because the game is may be customized, and the game Nodes or play locations may be any store, location, or landmark, the game may be tailored to appeal to any geographic theater or demographic. In other words, the gaming platform games may be created, with or without sponsors for teen boys in Los Angeles, "tween" girls in Singapore, or single adult females in London, Seoul, or Shanghai, to cite only a few examples of many.

In embodiments, the gaming platform may incorporate multiple revenue sources, each of which may be at low or no cost to the user. For example, revenue may be derived from retail participation, retail location fees, retail location point-of-presence bounties, retail revenue share, subscription fees, advertising, or some other revenue source. Retail location fees may be derived by partnering with retail chains in establishing a game grid. This game design provides the ability to steer customers directly into retail partners' establishments. Players' foot traffic may translate into store sales. Additional revenues may be derived by charging each retailer a per store fee of, for example, $25 per month to participate in a game grid. Retail location point-of-presence bounties refers to a revenue model based at least in part on charging each retailer a user visit fee of, for example, $0.025 per visit. Because the gaming platform is designed, in part, to put customers/users into the retail establishment, retailers may find a per visit bounty as an acceptable cost of customer acquisition. Retail revenue share refers to obtaining revenues from receiving a percentage of the purchase price a store may receive from a customer visiting the store as part of participating a game of the gaming platform. In an example, if 12.5% to 17.5% of retail visits result in a customer purchase, with an estimated average purchase will be $4.50, the operators of the gaming platform may receive 0.3% of the gross purchase price, or $0.0135 per purchase. Subscription fees may be charged to players for access to the gaming platform, or for access to premium games. In embodiments, the gaming platform may generate revenue from direct and indirect advertising as well. In embodiments, the gaming platform may enable its users to purchase in-game consumables items, typically known as "power-ups". These digital item purchases are characteristic of online casual games as well as in premium subscriber games. The TDD lays out a road map for the technical development of the project. This document makes note of the significant engineering features of the game, describes the intended approach to implementing these features (including 3rd party software or tools) and highlights high-risk elements of the project as well as the steps and procedures that will be taken to mitigate those risks. Much the same as the GDD, the TDD is a living document and is expected to be updated continuously over the development of the project as new information becomes available and priorities change.

In embodiments, the gaming platform may enable differing game designs and the artistic look and feel of each game to target specific demographics. The same basic underlying game-play may be coupled with varying artistic styles to attract audiences as different as the casual "tween" girl and the twenty-something hardcore male gamer. Combined with a relatively short production cycle, Poplio can also create content that artistically takes advantage of quickly emerging trends and current promotions.

In embodiments, the gaming platform may be modified or changed entirely in a very short period time and on a per-user basis. Furthermore, individual players may be able to modify and customize the game's appearance to suit their personal tastes. Two players might be presented with radically different graphics and art, even though the underlying rules of the game are the same. This customization can be taken to such extremes that the basic theme of the game may seem radically different for two different groups of players, even though both are participating in the same game. To a casual observer, it would appear to be two completely different games. One group could be playing a game presented as rival spy organizations vying to steal their opponent's top secret files, while another group is presented with a game where teams of wizards attempt to locate and rescue magical creatures, but both groups are playing the same game and competing against each other. The underlying game actions are translated into each group's preferred idiom.

In embodiments, the gaming platform may be used to create "meta-games" that are collections of smaller games that do not all share the same theme or story. Thus, the gaming platform may not need to restrict itself to games, stories, or art that appeals to the widest possible audience. Rather, the gaming platform may be used to create content that appeals to many small (but devoted) interest groups without the need for any individual game to reach a self-sustaining critical mass of players. This may allow the gaming platform to address demographic groups that might otherwise be underserved or ignored completely.

In embodiments, the gaming platform may provide players the tools to create their own customized content. In addition to being able to create personalized pages for themselves and their clan or guild, players may be given the means to create new interface art for their games similar to the custom "skins" that can be created for the popular music application WinAmp. Players may be able to create their own complete games based on the core gaming platform. This user-generated and customized content may reduce the burden on the gaming platform art team and help to ensure that no demographic, regardless how small, goes unserved. This flexibility may also empower the player base to self-identify new opportunities and new markets. If dozens of custom games are created based on a new TV series, the operators of the gaming platform may use this information as an excellent opportunity to approach the series' production company about partnering to create an official game.

In embodiments, the gaming platform may include a community web site constructed using standard HTML and Flash for certain interactive and premium content. This approach may allow the players to access the community contents from a number of different environments, from desktop computers to handheld devices. The site may be created using an established open source content management system (e.g. Drupal) that may provide community-focused building blocks, such as blogging tools, personal spaces, message boards, and calendars. This may allow developers to concentrate on building the community and adding rich content without wasting cycles on basic support systems.

In embodiments, the gaming platform may use distributed collection and aggregation techniques (e.g. the Map/Reduce algorithm popularized by Google) to manage the vast volume of player actions and calculate game statistics and results.

In embodiments, the gaming platform may feed players' actions into the platform via SMS messages, which may be automatically fashioned and sent by phones with location awareness or manually entered by the player (from a key code available at the retail outlet). As illustrated in FIG. 1, the gaming platform's SMS gateway 110 may receive the messages and translate them into actions in the game database to track the progress and results of individual games. A player's mobile communication facility 102 may be associated with a wireless carrier network 104 that is further associated with the Internet. A player participating in a game scenario running on the gaming platform may send a message, such as a text message, from his mobile communication facility 102 upon reaching, for example, a particular location. The message may be routed through a wireless carrier network 104, the Internet, through a firewall 108, to an SMS gateway 110. Messages sent by players may be stored in a message database 112 and further associated with other elements of the gaming platform. The information may be processed and fed to the community site where the status of games can be tracked in real-time.

Figure 2:
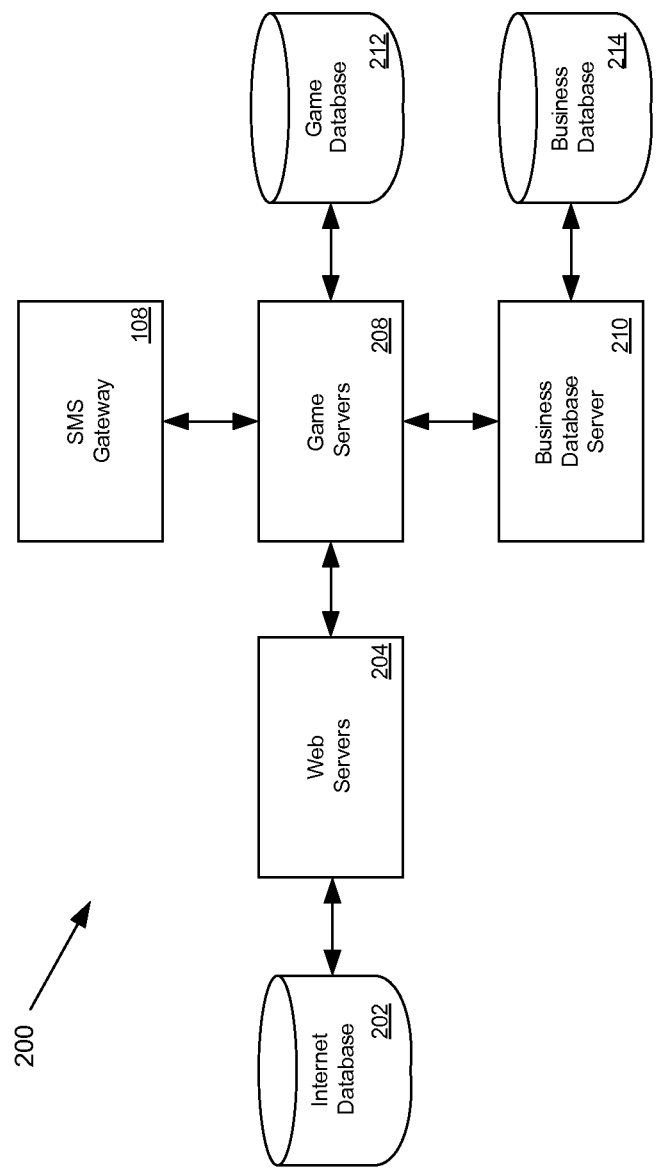
FIG. 2 illustrates a simplified architecture of the gaming platform.

As illustrated in FIG. 2, in embodiments, the gaming platform 200 may use a server platform that consists of a set of commercially supported open source software package, for example Linux, Apache (e.g. The Apache HTTP Server), MySQL/PostgreSQL, J2ME (e.g. JSR-179—Java Location API for Location-Aware Devices).

In embodiments, the gaming platform 200 may include an authentication system, SMS gateway 108, databases, and a community focused content management system. In embodiments, the gaming platform 200 may include, but is not limited to, an Internet database 202 associated with a plurality of web servers 204. The web servers 204 may be further associated with game servers 208. The game servers 208 of the gaming platform may be associated with an SMS gateway 108, a business database server, and a game database 212. A game database 212, or plurality of game databases may store gaming information such as game scenarios, the rules pertaining to game scenarios, player data, or some other type of game data. A business database server 210 may be associated with a business database 214. A business database 214 may include, but is not limited to, storing revenue information, sponsor information, or some other type of business data.

Figure 3:
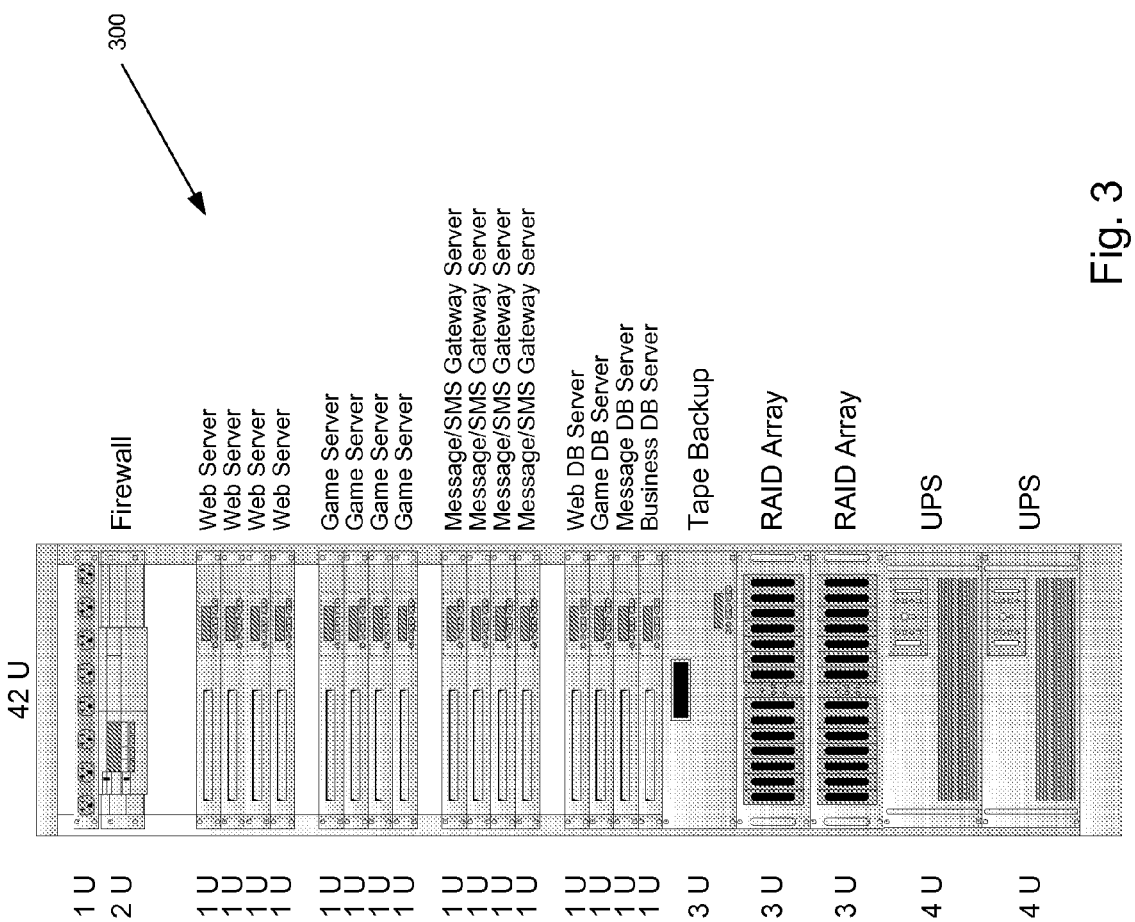
FIG. 3 illustrates a sample rack configuration within the gaming platform.

In embodiments, the gaming platform 200 may include a data center rack. In an example, a rack configuration 300, such as that shown in FIG. 3, may include servers, firewall, RAID arrays, and other equipment.

In embodiments, the gaming platform 200 may substantiate a proof of presence of a player in a retail partner's store by, for example, using existing location-based technologies currently deployed by cell phone carriers in the US, Europe and the developed Asian nations, or via point-of-purchase online cash register systems deployed throughout the retail sector. In each case, data may flow from the carriers and/or retailers to a gaming platform 200 database.

The game platform translates received SMS messages into actions by routing them to the game server, where they are then processed by the game system logic for the game in play. The results are then stored in a database that is available to the community site system for display in real-time.

Location-based technologies currently in use by cell phone carriers includes GPS and aGPS (assisted GPS).

Other game platform systems include matchmaking, chat, and friends management.

Other equipment required for the gaming platform 200 are internet routers, internet switches, uninterruptible power supplies, and automated backup storage devices.

In embodiments, the gaming platform 200 may partner with entities in numerous industries including, but not limited to, retailers, cell phone operators, carriers and manufacturers, internet portals, credit cards, and other industries.

In embodiments, the gaming platform 200 may use co-marketing campaigns with retail, cell phone carriers, credit card partners, or other industry partners.

In embodiments, the gaming platform 200 may use "street teams" that seed message boards, blogs, and chat rooms with information about the gaming platform 200.

In embodiments, the gaming platform 200 may use tell-a-friend incentive promotions for beta testers and for players.

In embodiments, the gaming platform 200 may include game playing types such as "colony." Colony mixes aspects of Battlefield 2 with Real-Time Strategy, but in a live-action, location based format. Colony has players assume the role of an alien race which comes to earth to conquer as much land as possible. Like the land rush of the American west, Earth is fertile ground for colonization, and each team of aliens will fiercely battle over the right to claim each of the node locations as their own.

In embodiments, at the start of the game, each player may choose a team (or play with his regular clan) and choose a team role. The team role may or may not be changed until the end of each round. (Round length may be dependent on number of players or other parameters set up by the players themselves.) The team roles may be: Scout—Scouts explore the environment searching for new nodes, resources (like energy, food, or building materials), enemy hives, and special power-ups. Scouts report these positions back to their home Hive, where other player types can act on that intelligence in various ways. The Scout is a good role for players that are constantly on the go and cover a wide area during their daily routine. Forager—Foragers get reports sent to them by their team Scouts, pointing them to valuable resources and power-ups. The forager's job is to go out to the locations their scouts send them and pick up the virtual loot before the other teams can get to them. A good forager is a player that knows their neighborhood really well and knows the fastest route between any two points in the city. Engineer—Engineers can spend the resources that the scouts and foragers collect to establish new hives for the colony. Hives are home bases where resources can be stashed and players can re-energize their character's health/energy. Hives also determine the amount of terrain captured by a given team. Engineers can also repair damaged Hives and disarm enemy bombs. Engineers may be players that don't move around that much, but tend to hang out at their favorite Hive to provide constant damage control. Soldiers—Soldiers are a player type that can "damage" other player's avatars. Rather than face to face style combat, soldiers may set traps or land mines that can take energy/health away from the other team. Soldiers can also plant spores that take over opposing Hives. Soldiers can also act as guards for existing Hives, or as bodyguards to Queens. Queens—The Hive Queens are the eyes and ears of the team. They are a player type that has access to all of the data collected by his/her teammates, and can send orders, waypoints, etc. to the team. Whenever a Hive Queen is at a Hive (node), he/she can drop a force field which gives the Hive an extra defensive barrier to attack that lasts a finite amount of time. Queens are the weakest unit in the game and take the most amount of damage from traps and bombs. A good Queen player may be someone that's a great multitasker and isn't shy about giving out orders.

In embodiments, each round may be scored based on the number of Hives captured and successfully defended from enemy attack. In turn, each player may be scored based on their personal performance (e.g. number of resources collected, number of Hives captured, etc.)

In embodiments, the gaming platform 200 may include game playing types such as "skullduggery." Skullduggery is a game of pirating, smuggling, and trading. Each team or clan swears its allegiance to one of a series of fictional nations, transforming their familiar streets and highways into pirate infested seas and their favorite haunts (nodes) into exotic trading ports. In Skullduggery, each player is the captain of his own ship. Whether or not that ship engages in legitimate trading or occasionally flies the Jolly Roger as a pirate is entirely up to the player and his teammates. Players can visit the various nodes in the game and speak to the "merchant" or "governor" of each "port", who will offer the player various goods to trade or special errands and missions. Just like a traditional sea trading game, the player travels from one node to the other hoping to get the best price for the goods in his hold while avoiding pirate attack. The game may be played in rounds, and the team with the highest amount of booty plundered and goods traded wins the round.

In embodiments, pirate battles on the high seas may be stat-based affairs. When wandering around "the open sea" (your physical neighborhood) or visiting a port (a node) you will see a roster of ships that are within the range of your guns. If the ship is a teammate, you can wirelessly trade goodies that you've collected like pieces of treasure maps and magical artifacts. If the ship is an enemy team (or fair pickings for plundering) you can choose to open fire. Dice rolls are exchanged on the server in a turn-based manner, taking into account upgrades that players earn in the game like better guns, shielded hulls, tougher sails, etc. Battle ends when one of the players either a.) surrenders, b.) flees, or c.) sinks. When a player surrenders, the treasure in his hold is taken, but he lives to fight another day. The player can physically leave the proximity of the node where the combat is taking place, is essence escaping the battle. Or, if the player is sunk, the winner recovers only a portion of the cargo, but the loser must physically return to the nearest port controlled by his team to replace his lost ship and crew.

In embodiments, the real world may be peppered with secret locations (nodes) that hold surprises like buried treasure, pieces of pirate maps, magical idols, etc. Players can trade these collectibles with their teammates by physically visiting the same port. Teams can also capture a port and convert it to a team port (home base) by congregating multiple team members at a given node and sinking any opposition. Team Ports are places where players can replace sunken ships and crew.

In embodiments, the gaming platform 200 may include game playing types such as "Mac Attack" (for MacDonalds) or "Jack Attack" (for Jack-in-the-Box), and so forth for other entities. This game embodiment may be a cross-media variation of "capture the flag" or "tag". In Mac Attack, there may be a number of virtual Big Macs (or Jack in the Box Bobble Heads) scattered every few city blocks. At the start of each round, the players attempt to find the node where the nearest Big Mac is hiding. Once he finds and captures the Big Mac, he needs to take it back to the nearest McDonalds node to score a goal for his team. During normal play, the player may only see when other players on his own team are near his proximity. When he picks up the Big Mac, he can see both teammates and opponents in his area—and they can see him. The player holding the Big Mac wants to get to the nearest goal without having the Big Mac stolen by his opponents. Opponents may steal the Big Mac by challenging the player to a game of virtual rock, paper, scissors. If he wins, he stays in possession of the Mac. If he loses, the opponent steals the Mac, and the losing player cannot immediately challenge him. However, he can send up a "signal flare" to his teammates that will direct them towards the stolen Mac. Likewise, if the person holding the Mac wins the RoShamBo match, the challenger cannot immediately rechallenge the winner. Players may also pass the captured Mac to any of his teammates in his physical proximity. He first sends out a request to pass the Mac, and if his teammate accepts, the pass initiates. Passing takes x number of seconds, during which the Mac cannot be stolen. Thus, well-coordinated groups can pass the Mac back and forth like soccer players towards a goal, constantly keeping the opposition off guard. Each time a goal is scored, the Mac resets in a new, random location somewhere within the game area. There will always be a set number of Macs in play in any given area, so it will always be possible to steal or capture one of the Macs and try to score a goal. In embodiments, this basic mechanic may be used for any number of themes: similar branding could be offered to Fifa or World Cup Soccer, NBA Basketball, Red Bull, Gatorade, or any other brand that emphasizes being fast on your feet, working as a team, and going for the goal.

In embodiments, the gaming platform 200 may include game playing types such as "mother load." In Mother Load, players may assume the role of prospectors working for their team's mining operation. Like the "Colony" game, Mother Load uses team roles for various play styles and actions: Geologists—Geologists' phones may be transformed into a "Gem Hunter", a high-tech diving rod that guides them to veins of precious metals and gems hidden in each of the game's secret nodes. Some of the node locations are known to all teams at the start of the game, but others are hidden and can only be discovered by Geologists. Geologists report their findings back to the team. Their score is based on a percentage of the gems and ore that are successfully mined from each node they discover. Prospectors—Prospectors may establish a mine on the veins that the Geologists find. Each Prospector is armed with a finite number of dynamite sticks. These can be used to either excavate a mine, or as offensive weapons to destroy the opposition's mines. Miner—A miner is the grunt labor but a key member of the team. Miners can collect the virtual precious metals and gems from the mines established by his team. Miners first fill their cell phone "bucket" up with treasure, then pass it to another Miner at the next node until the treasure load makes it back to the home base, and haul it back to their nearest team base to convert it into points for his team. Miners' scores may be based on the amount of ore or gems they manage to carry back to their base. Miners can be raided by enemy Guards. When an enemy Guard chooses to raid a Miner from another team, the engagement is played out using a simple rock/paper/scissor mechanic. Guards—Guards are the hired muscle of the mining operation. The number of guards at any given node determines the strength of the mine and the number of sticks of dynamite it will take the enemy team to destroy the mine. Guards can also act as escorts to Miners returning with phones loaded with loot. If a Guard is within physical proximity (at the same node as) one of his team's miners, and that miner is challenged by an enemy, the Guard plays the RoShamBo game against the attacker, giving the Miner a chance to escape. If there are multiple Guards assigned to a Miner, the attacking enemy has to make it through a RoShamBo match through all of the Guards before he gets a crack at the Miner's loot. In embodiments, at the end of the round, the team that has mined the most treasure is the winner. In this game, the number of nodes captured is of less importance than the quality of the treasure found in each node. For example, a gold mine is worth more than a silver mine; a diamond mine is worth more than an emerald mine, etc. However, the amount of ore/gems in any given node is different from node to node. Thus, a really full silver mine could potentially yield more points than a relatively small Gold Mine.

In embodiments, the gaming platform 200 may support an action game pitting two teams against one another in an attempt to roll a virtual ball into their opponent's goal. The game may be scaleable to a variety of geographies including, but not limited to, a metropolitan area, a state, a country, international scale, or some other geography size. The game may accommodate a plurality of team sizes including, but not limited to teams consisting of tens of players, hundreds of players, thousands of players, or some other team size.

In embodiments, the game may be adaptable to any location, for example, by selecting landmarks that are known to the participants in the game. A plurality of landmarks may be selected. In an example, the landmarks may be the well known location of the Disneyland and Universal Studios theme parks. The two theme parks may act as the virtual goals into which the teams are trying to roll the virtual ball. In embodiments, between these two goals there may be located hundreds of game nodes that serve as a virtual game board. The game nodes may be associated with real world, physical locations, such as a store. A game node may be sponsored by an entity, such as a store owner or some other entity. At the beginning of a game the virtual ball may be situated between the two goals. This ball location may, in turn, be associated with a real world geography, such as an intersection, town name, store location, or some other geographic location.

In embodiments, the goal of the virtual ballgame may be to score more points than the other team by the end of the game. In an example, points may be scored by rolling the virtual ball into the opposing team's goal. In embodiments, the length of a virtual ballgame may be scalable from a matter of hours, to days, weeks, months, years, or some other time frame. During game play, players may interact by visiting node locations (e.g., a sponsor store location) and sending a GPS encoded SMS to the servers of the gaming platform 200. By visiting the node and sending the message, the player may "charge" the node for his team. The charging of the node may have the effect of emitting a virtual beam that pushes the virtual ball in a direction. The players may strategically select which nodes to visit based at least in part on the predicted effect the charging of a node will have on the direction in which the ball will be forced as a result of the node charging. Players may selectively visit nodes that serve to advance the virtual ball towards the goal in which the wish to deposit the ball and, thereby, gain an advantage over the opposing team(s). In an example, the force required to move the ball may be scalable such that forcing the ball to move requires a plurality of players to act in concert and visit a node. For example, to move the ball the game may require ten players to visit the node prior to moving the ball. The player visits to the node may be subject to additional game rules, such as forcing all ten players to visit the node within 2 hours of each other. In embodiments, the game may provide no limit to the frequency with which a player can charge nodes, but there may be rules limiting a player to only charge each individual node once every half-hour, or some other temporal interval. In embodiments, if multiple players charge a node simultaneously the effect may be multiplied as opposed to simply added. For example, if two players charge a node at the same time it may emit a node beam that pushes the ball the same amount as 4 individuals, and if 10 players all charge at once the force may be equivalent to 100 individuals, and so forth.

In embodiments, a point may be scored for each time that the ball rolls into the opponent's goal. After a goal is scored, the ball may be reset to the center of the playing field.

In embodiments, each time a point is scored and the ball may be reset and all nodes may toggle between pushing and pulling, forcing teams to adjust their strategy accordingly.

In embodiments, there may be greater than two teams and greater than two goals used during a game. In an example, a game with greater than two teams participating may adopt a rule that a team is removed from the game after a specified number of goals have been scored in its goal. This may have the effect, in part, of providing an incentive for teams to form alliances to target the removal of a particular team. For example, in a game consisting of Teams 1, 2, and 3, Teams 1 and 2 may agree to work in alliance to force the virtual ball only in the direction of Team 3's goal in order to eliminate Team 3 from the game, forming a détente between Teams 1 and 2 until Team 3 is removed. This may serve to add a strategic, social networking aspect to the game play.

In embodiments, the time period near the end of a game may adopt a new rule set in order to speed the pace of the game in its final moments. In an example, on the final day of the game, scored goals may be worth two points each and all nodes, or a subset of nodes, may emit double force, triple force, etc. in order to speed the pace of the game. Once a game ends, the players may be messaged with the final score and a break down of their own personal performance. Star players may be called out and players may be encouraged to log onto the gaming platform 200 website to watch a replay of the game with color commentary.

In embodiments, rewards may be provided to star players, winning teams and the like by sponsors. The sponsors may be the same entities whose stores or other locations serve as game nodes during game play. Players or teams receiving rewards may have to visit the sponsors in order to pickup their rewards.

In embodiments, teams may be formed in leagues. Teams and leagues may be ranked. Players may be traded, bought, waived, released, and the like from teams. Players may become free agents. Players may sign contracts with teams, leagues, sponsors, and the like. Players may be celebrities. Teams may have sponsors. Players or teams may have uniforms. Uniforms may be associated with a sponsor.

In embodiments, a player may choose to increase the force with which he may advance the virtual ball when visiting a game node by making a purchase at the sponsor's location that is associated with the game node. For example, a game node may be associated with a fast food restaurant. The player may emit a beam and advance the ball simply by virtue of visiting the node and sending a message. However, the game rules may further specify that if he makes a purchase of $5-$10 his beam strength will be double, and so forth. The gaming platform 200 operator may have a revenue-sharing agreement with the sponsors that are associated with the game nodes to share in the income derived from these "beam-strength" purchases.

In embodiments, the players may have blogs on the gaming platform 200 servers.

In embodiments, a plurality of still cameras, motion picture cameras, video cameras, webcams, phonecams, or some other camera type may be used to capture still and/or motion imagery of the gaming geography (e.g., Manhattan). The photo/video imagery may be captured in real time, at time intervals, upon request of a game administrator, upon request of a team or player, or in response to some other command. The photo/video imagery of the gaming geography in which a particular game is occurring may be combined with the virtual game imagery to create a plurality of images in which the virtual phenomena appear to have presence within the real world geography. In an example, a webcam atop a skyscraper in New York City may capture real time video imagery or still photos of the New York skyline. As a virtual ball game occurs with the gaming geography of New York City and the balls are pushed by the players, the virtual imagery of the balls, goals, and the like may be combined with the real world imagery of New York to give players a sense of where their balls of interest are located in relation to the physical world in which they are playing: New York. The images combining the real and the virtual gaming space may be made available to players in real time. The images may be made available over the Internet or some other networked platform. In embodiments, players may be able to submit real world imagery to the gaming platform 200 to be combined with the virtual imagery. This imagery may be able to be shared between players on a team.

In embodiments, the gaming platform 200 may support an action game that pits a plurality of teams against one another in an attempt to maneuver virtual balloons to a target location and stay there as long as possible.

In embodiments, the playing field may be a real world geographical location, such as the Island of Manhattan, the State of Texas, Interstate 95, or some other geography. In embodiments, within the playing field there may be located hundreds of game nodes that serve as a virtual game board. The game nodes may be associated with real world, physical locations, such as a store. A game node may be sponsored by an entity, such as a store owner or some other entity. In embodiments, within the playing field there may be located a plurality of "target rings" that are created in a random location. The number of target rings present in a given game may be determine, based at least in part on the number of players and/or teams that are participating in the game. Each target ring may be a virtual ring. The size of each virtual ring may vary and be scalable. A ring may be, for example, two blocks in diameter; another ring in the same game may be one block in diameter; rings may fluctuate in diameter over time throughout a game's duration, and so forth.

In embodiments, an objective of the game may be for the teams to attempt to move their giant balloons into these rings in order to score points.

In embodiments, each team may select a virtual balloon to be their team mascot and avatar for the game. The balloons may large, for example, similar to the size of a Macy's Thanksgiving Parade balloon. In embodiments, the size of a balloon may vary by the number of players on a team. In embodiments, the balloons may take a variety of shapes; clowns, rockets, planes, vegetables, etc. In embodiments, teams may color their balloons to further distinguish themselves and establish their team identity. In embodiments, teams may be able to select from a number of licensed balloons; sports mascots, giant bottles of Coke, or a Virgin Airlines Jet to name just a few possible examples. In embodiments, each balloon may begin the game near the starting location of a team's founder.

In embodiments, each team may attempt to score as many points as possible by the end of the game period. In embodiments, the length of a game may be scalable from a matter of hours, to days, weeks, months, years, or some other time frame. In embodiments, points may be scored by entering the target rings that appear randomly around the city. During game play, players may interact by visiting node locations (e.g., a sponsor store location) and sending a GPS encoded SMS to the servers of the gaming platform 200. By visiting the node and sending the message, the player may "charge" the node for his team. The charging of the node may have the effect of pushing the virtual balloon in a direction. The players may strategically select which nodes to visit based at least in part on the predicted effect the charging of a node will have on the direction in which the balloon will be forced as a result of the node charging. Players may selectively visit nodes that serve to advance the virtual balloon towards the ring in which the wish to deposit the balloon and, thereby, gain an advantage over the opposing team(s). In embodiments, if multiple players charge a node simultaneously the effect may be multiplied as opposed to simply added. For example, if two players charge a node at the same time it may push the balloon the same amount as 4 individuals, and if 10 players all charge at once the force may be equivalent to 100 individuals, and so forth.

In embodiments, when balloons collide they may react with exaggerated effects, as if they were giant rubber balls. In embodiments, the size of each balloon may be proportional to the number of players on it's team. In embodiments, the size of a balloon may determine how much inertia it has. For example, larger balloons (belonging to larger teams) may be able to knock smaller balloons out of the way. However, larger balloons may also require more players to move them, making smaller balloons more maneuverable.

In embodiments, teams may score points by maneuvering their balloons into the target rings and keeping them there. For example, every 10 minutes, or some other time interval, each balloon that is the only balloon in a particular target ring may score 1 point. If more than one balloon is inside the ring at the 10 minute mark, no points may be awarded. One team may have to knock the other balloons out of the ring to score points. In embodiments, once a given target ring has awarded 6 points, or some other point total, to any team or combination of teams, it may disappears and a new target ring may be created somewhere in the game play geography. Teams may be notified when a new target ring appears. At the end of the game, points may be tallied and the winners announced.

In embodiments, rewards may be provided to star players, winning teams and the like by sponsors. The sponsors may be the same entities whose stores or other locations serve as game nodes during game play. Players or teams receiving rewards may have to visit the sponsors in order to pickup their rewards.

In embodiments, teams may be formed in leagues. Teams and leagues may be ranked. Players may be traded, bought, waived, released, and the like from teams. Players may become free agents. Players may sign contracts with teams, leagues, sponsors, and the like. Players may be celebrities. Teams may have sponsors. Players or teams may have uniforms. Uniforms may be associated with a sponsor.

In embodiments, a player may choose to increase the force with which he may advance the virtual balloon when visiting a game node by making a purchase at the sponsor's location that is associated with the game node. For example, a game node may be associated with a fast food restaurant. The player may emit a beam and advance the balloon simply by virtue of visiting the node and sending a message. However, the game rules may further specify that if he makes a purchase of $5-$10 his beam strength will be double, and so forth. The gaming platform 200 operator may have a revenue-sharing agreement with the sponsors that are associated with the game nodes to share in the income derived from these "beam-strength" purchases.

In embodiments, the players may have blogs on the gaming platform 200 servers.

In embodiments, a plurality of still cameras, motion picture cameras, video cameras, webcams, phonecams, or some other camera type may be used to capture still and/or motion imagery of the gaming geography (e.g., Manhattan). The photo/video imagery may be captured in real time, at time intervals, upon request of a game administrator, upon request of a team or player, or in response to some other command. The photo/video imagery of the gaming geography in which a particular game is occurring may be combined with the virtual game imagery to create a plurality of images in which the virtual phenomena appear to have presence within the real world geography. In an example, a webcam atop a skyscraper in New York City may capture real time video imagery or still photos of the New York skyline. As a virtual balloon game occurs with the gaming geography of New York City and the balloons are pushed and pulled by the players, the virtual imagery of the balloons, target rings, and the like may be combined with the real world imagery of New York to give players a sense of where their balloons of interest are located in relation to the physical world in which they are playing:

New York. The images combining the real and the virtual gaming space may be made available to players in real time. The images may be made available over the Internet or some other networked platform. In embodiments, players may be able to submit real world imagery to the gaming platform 200 to be combined with the virtual imagery. This imagery may be able to be shared between players on a team.

Figure 4:
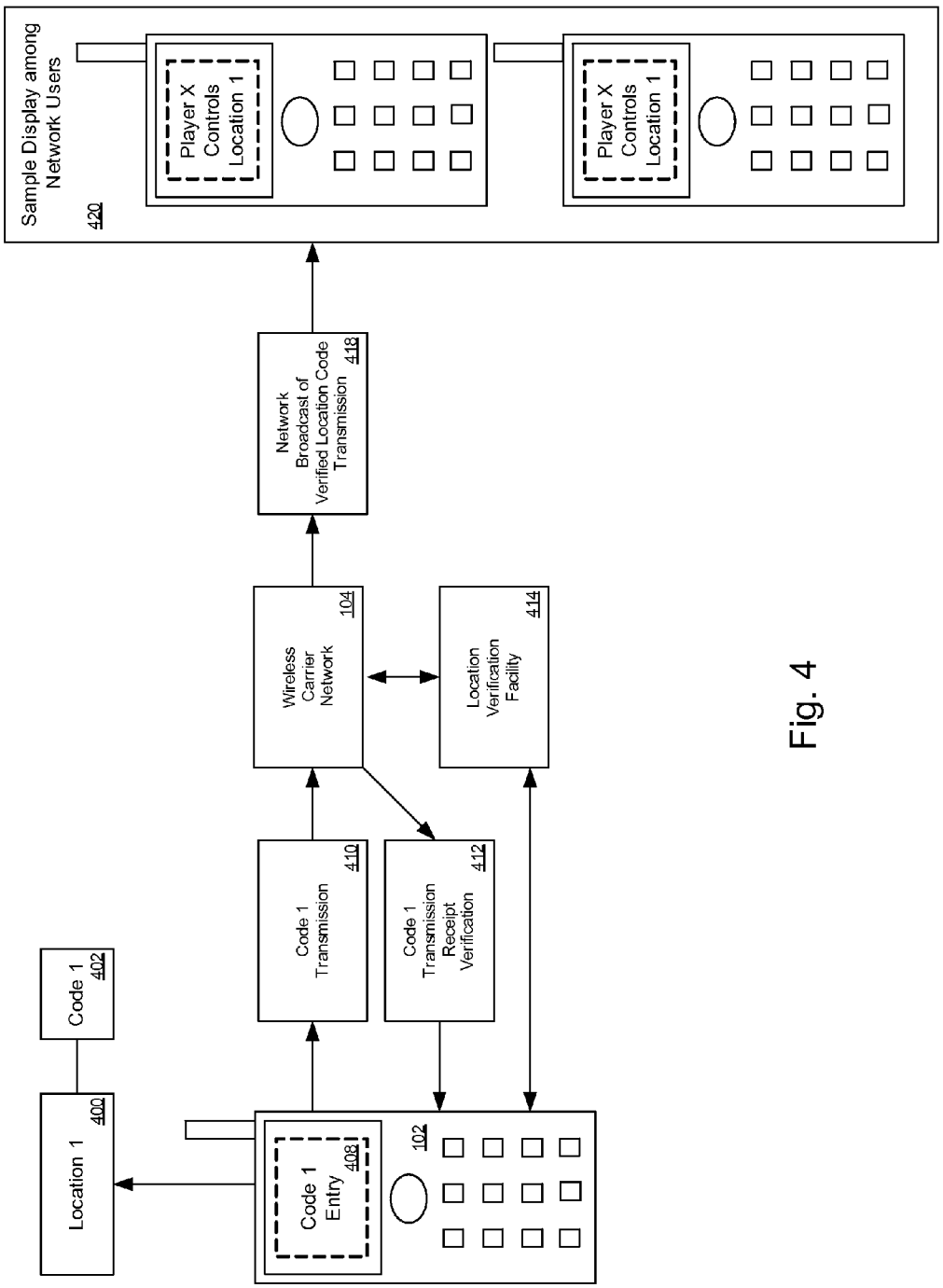
FIG. 4 illustrates the creation and verification of a location code transmission.

Referring to FIG. 4, in embodiments, the present invention provides a method and system for associating a geographic location 400 with a code 402, transmitting the code 410 to a wireless carrier network 104 using a mobile communication facility 102, verifying the code transmission receipt at a geographic location 400 using a location verification facility 414 located at the geographic location 400, sending a confirmation of transmission receipt 412 to the mobile communication facility 102, and broadcasting the verification to a network 418. In embodiments, the broadcast of the verification to a network 418 may result in displaying 420 a notice of control of the geographic location 400 to other users of the wireless carrier network 104. This notice may also be broadcast using the Internet, email, text message, phone call, or any of the other methods and systems described herein.

In embodiments, upon broadcasting of the verification, a measure is awarded based on the verification. A measure may be a location control measure of a multiplayer game. A location control measure may be based at least in part on a distance of the mobile communication facility from the geographic location at the time of the code transmission. A location control measure may be based at least in part on a criterion. A criterion may be a purchase at a geographic location, a visit duration at a geographic location by a player, a fee payment made by a player, a receipt of a sponsor code transmission, or some other criterion. A sponsor code may include a coupon code, proof-of-purchase code, or some other type of sponsor code. In embodiments, a measure may be a territory control measure of a multiplayer game.

In embodiments, the verification may be broadcast to a plurality of mobile communication facility users. The verification control facility may use a local wireless network to identify a mobile communication facility of a user that is in proximity to the geographic location.

In embodiments, the game platform may be able to identify whether the mobile communication facility is present at the geographic location near the time of entering the code.

In embodiments, a geographic location may be a virtual geographic location, a retail store, a landmark, a location defined by a mobile communication facility user, a ground level location, a subterranean location, an above ground level location, or some other location.

In embodiments, the geographic location of a mobile communication facility may be established using triangulation, GPS, or some other location finding technology.

In embodiments, a code may be associated with a game scenario or a plurality of game scenarios.

In embodiments, a code may be transmitted by calling a phone number, sending an SMS or some other form of text message, using a website or some other means of transmission. In embodiments, transmission of a code may invoke a fee to a player or team that is sending the code. A code transmission fee may be billed to the account associated with the mobile communication facility from which the code is transmitted. In embodiments, a code transmission receipt may be confirmed to the mobile communication facility.

In embodiments, a broadcast may be made using the Internet, a webpage update, a social networking site, an email, a text message, a wireless provider, a voice mail, an automated voice mail, a wireless provider and the Internet in combination, an interactive user interface, or some other broadcast means. A broadcast may invoke a fee. An automated voice mail may be created by a user of the mobile communication facility gaining location control of the geographic location. An interactive user interface may include a map. A map may be a satellite image, a graphic rendering, a three-dimensional map. An interactive interface may include a blog, sponsored content, or some other type of content. Sponsored content may be associated with the geographic location.

In embodiments, the present invention may enable creating a code that may be entered in a mobile communication facility, associating the code with a unit of a location verification facility that may be further associated with one or more of a plurality of geographic locations, establishing a geographic location of the mobile communication facility, transmitting the code from the mobile communication facility, computing with the verification facility a location verification measure associated with the geographic location and the mobile communication facility, and broadcasting the measure to a network.

Figure 5:
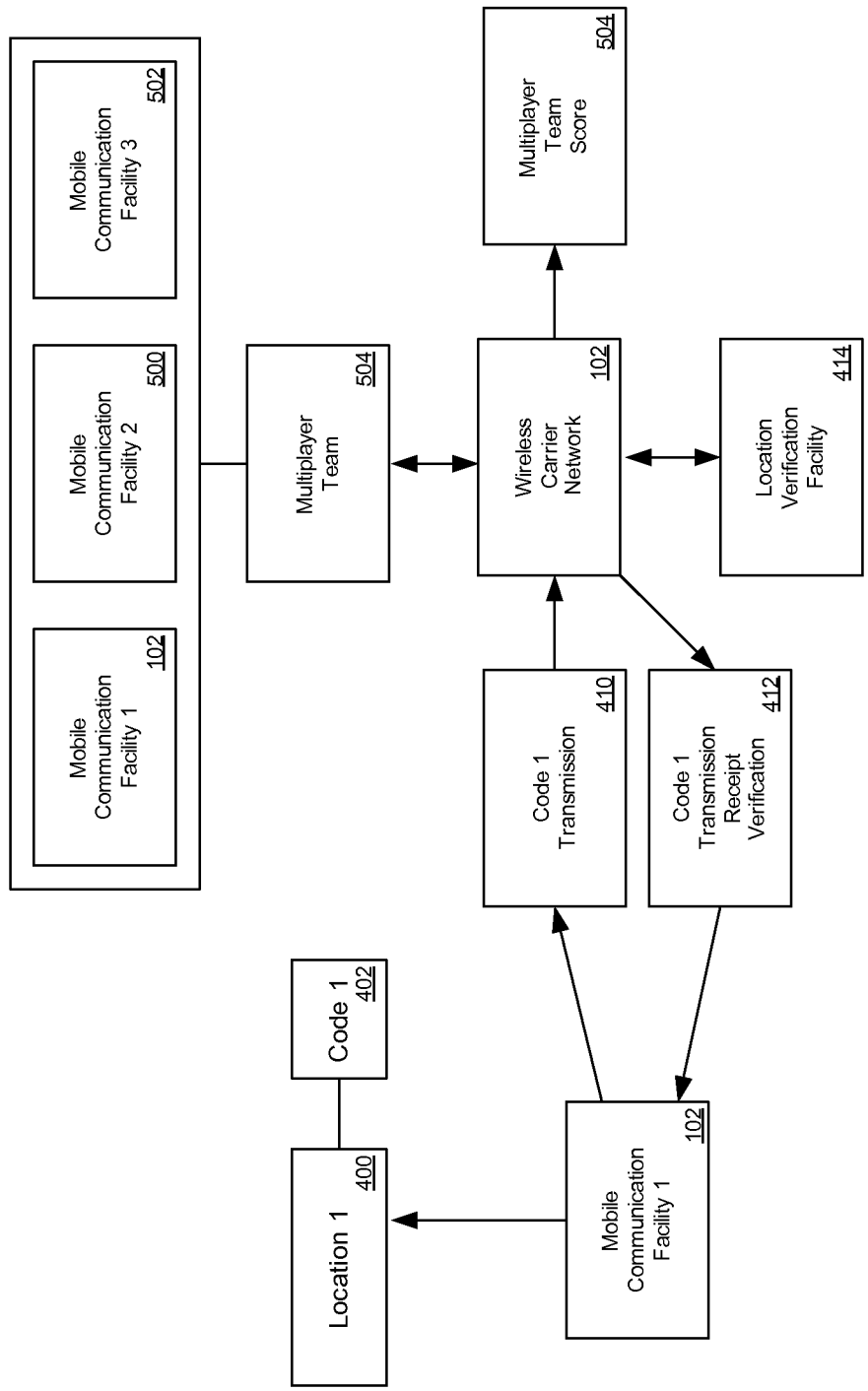
FIG. 5 illustrates the creation of a multiplayer team score.

Referring to FIG. 5, in embodiments, the present invention may enable associating a mobile communication facility 102 with a plurality of mobile communication facilities (500, 502), wherein the association forms a multiplayer team 504, associating a code 402 with a geographic location 400, transmitting the code 410 using the mobile communication facility 102, identifying whether the mobile communication facility is present at the geographic location 400 near the time of entering the code 402, and creating a first multiplayer team score 504 based at least in part on verifying that the mobile communication facility is present at the geographic location near the time of the code transmission.

Figure 6:
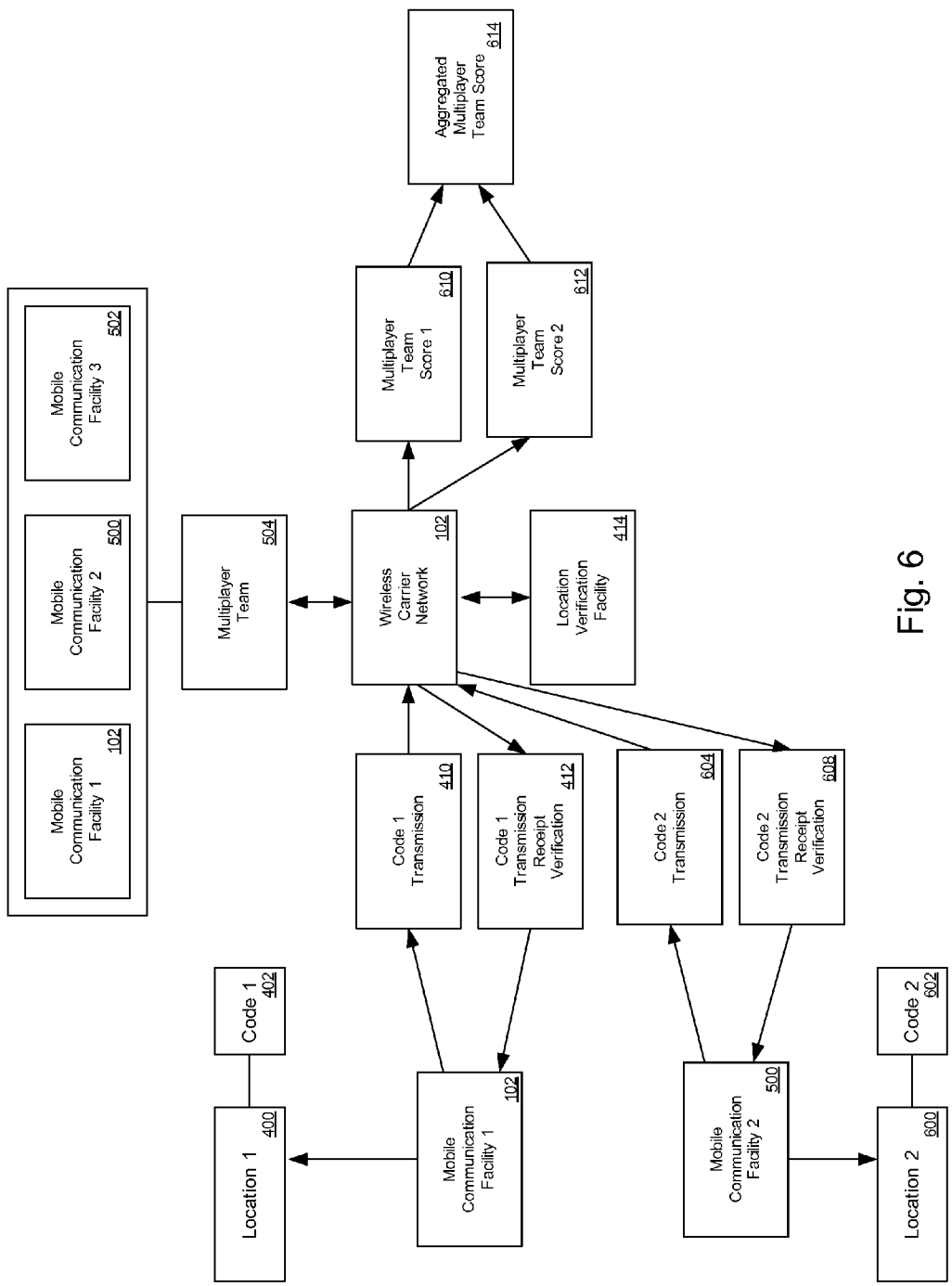
FIG. 6 illustrates the creation of an aggregated multiplayer team score.

Referring to FIG. 6, in embodiments, a first multiplayer team score 610 may be aggregated 614 with a second multiplayer team score 612 from a second code transmission 604 that is related to a second geographic location 600 and second code 602. A second mobile communication facility 500 from the multiplayer team 504 may be used to send the second code transmission 604. The wireless carrier network 102 may send the second mobile communication facility 500 a verification 608 that the second code transmission 604 was successful. In embodiments, a plurality of multiplayer team scores may be created from a plurality of code transmissions and used to form an aggregated multiplayer team score 614. Code transmissions (410, 604), and the multiplayer team scores (610, 612), may derive from a single mobile communication facility visiting multiple locations, a single mobile communication facility visiting a single location more than once, a plurality of mobile communications visiting the same location, or a plurality of mobile communication facilities visiting a plurality of locations.

In embodiments, an aggregated multiplayer team score may be weighted based on a criterion. A criterion may be a purchase at a geographic location, a visit duration at a geographic location by a player, a fee payment made by a player, a receipt of a sponsor code transmission, or some other criterion. A sponsor code may include a coupon code, proof-of-purchase code, or some other type of sponsor code. In embodiments, a measure may be a territory control measure of a multiplayer game.

In embodiments, an aggregated multiplayer team score may be converted into a weighting of a multiplayer team's location control measure. A weighting of the multiplayer team's location control measure may diminish as a function of time. The diminution of the weighting of the multiplayer team's location control measure may be halted upon receipt of a third code transmission by at least one of a plurality of players' mobile communication facilities.

In embodiments, a multiplayer team's location control measure may be broadcast to a plurality of multiplayer teams.

In embodiments, an association of a player's mobile communication facility with the plurality of mobile communication facilities may be made using the Internet, a wireless provider, or some other means of communication. The association may form a team.

Figure 7:
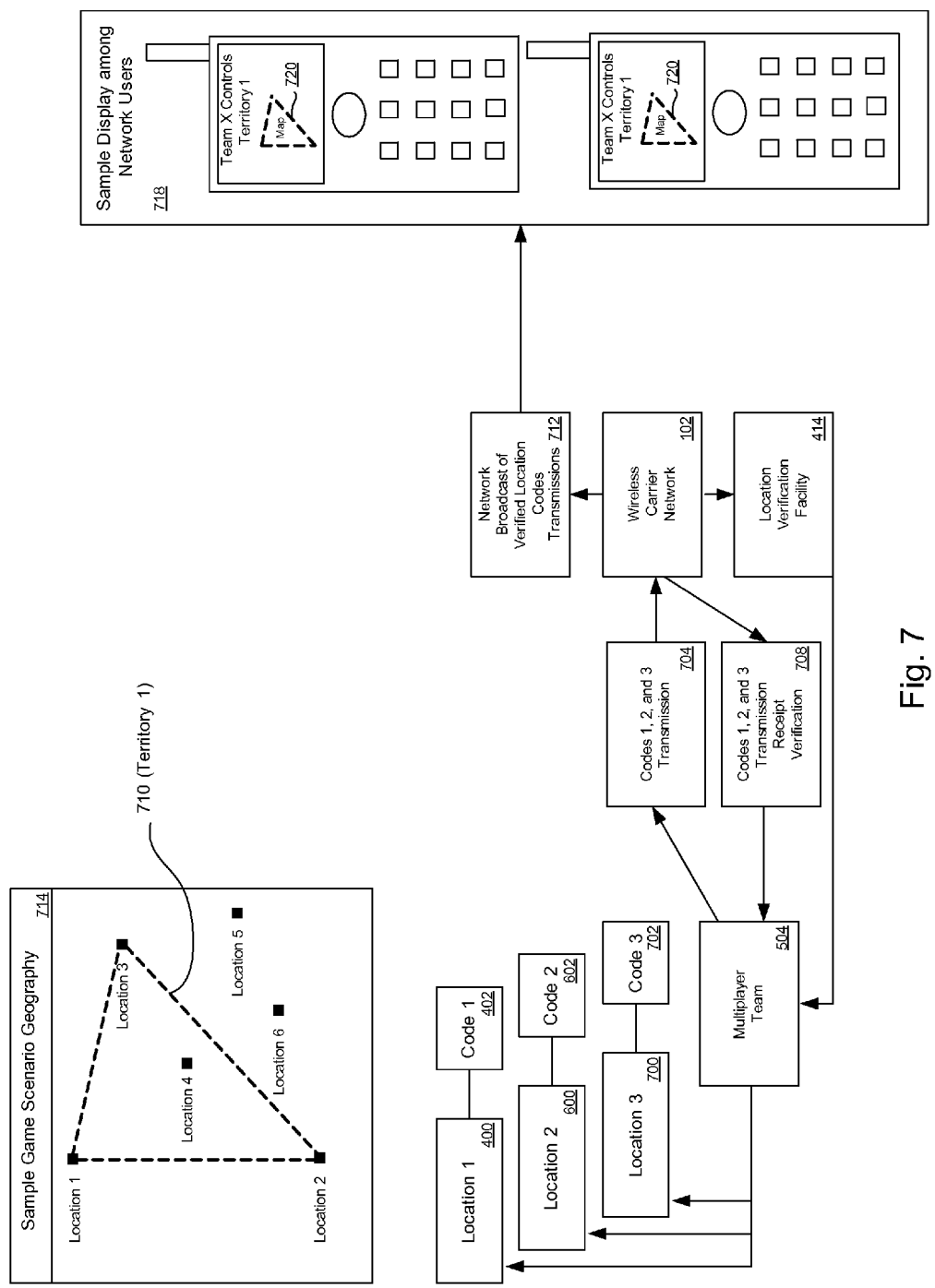
FIG. 7 illustrates an example of a team gaining control of a territory.

Referring to FIG. 7, in embodiments, the present invention may enable creating a first code 402 associated with a first location 400, a second code 602 associated with a second location 600, and a third code 702 associated with a third location 700, lines among the three locations defining a perimeter of a geographic territory 710 within a game scenario geography 714, transmitting the first, second, and third codes 704 using at least one mobile communication facility that is associated with a multiplayer team 504, verifying location of the mobile communication facility upon receipt of the codes' transmissions using a location verification facility 414, sending a transmission receipt verification 708 to the multiplayer team 504, and upon verification of at least three codes, awarding a territory control measure for the geographic territory 710 to an entity associated with the mobile communication facility, such as a multiplayer team 504. In an embodiment, the network 102 may broadcast the verification of the location codes' transmissions 712 to the users of the network 102. The broadcast may be associated with a display 718 to network users of a map 720 indicating the territory that is controlled by the multiplayer team 504.

In embodiments, a rival location control that is associated with a location within a geographic territory, for example "Location 4" shown in FIG. 7, may be eliminated upon awarding territory control to a team or individual. The rival location control may be associated with a rival mobile communication facility in competition for location control with the mobile communication facility.

In embodiments, the present invention may enable associating a code with a geographic location, tracking a transaction at the geographic location and associating the code with the transaction upon verification of a user's presence at the geographic location, calculating a revenue associated with the transaction, awarding a location control measure based on the code and the transaction, and receiving a share of the revenue associated with the transaction.

In embodiments, a share of revenue derived from a sponsor, location, code transmission, or the like, may be retained by the gaming platform 200 and/or entities associated with the platform.

In embodiments, a code associated with a geographic location may be automatically sent for a player or team.

In embodiments, a player or team may be provided an incentive upon receipt of the transmitted code. An incentive may be a coupon or some other incentive.

In embodiments, a transaction may be a webpage view, an online advertisement conversion, an online transaction, an online survey completion, a visit to a geographic store location, a purchase at a geographic store location, a club enrollment, a credit card enrollment, a credit card purchase, a phone call, a text message, a viewing of television content, or some other transaction type.

In embodiments, a code may be transmitted using a mobile communication facility, a telecommunications land line, the Internet, email, ground mail, a television, a fax, or some other means of transmission.

In embodiments, revenue may derive from advertising, a purchase or transaction, a sponsorship, a subscription, or some other means of revenue creation.

Figure 8:
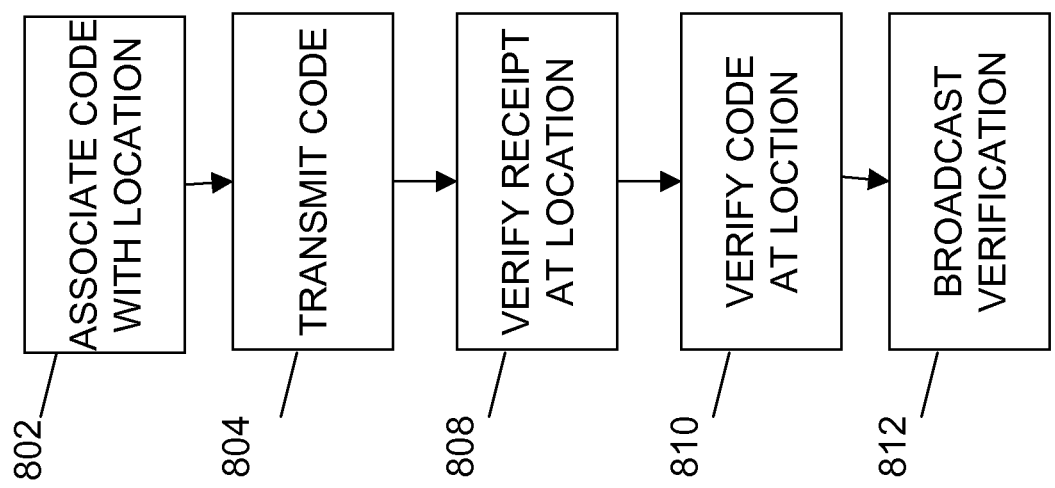
FIG. 8 illustrates steps in a method for taking an action based on verification of a location of a mobile communication facility with a location-based code.

FIG. 8 illustrates steps in a method for taking an action based on verification of a location of a mobile communication facility with a location-based code. This may include at a step 802 associating a geographic location with a code; at a step 804 transmitting the code using a mobile communication facility; at a step 808 verifying the code transmission receipt at a geographic location using a location verification facility located at the geographic location; at a step 810 verifying the code and at a step 812 broadcasting the verification to a network.

Figure 9:
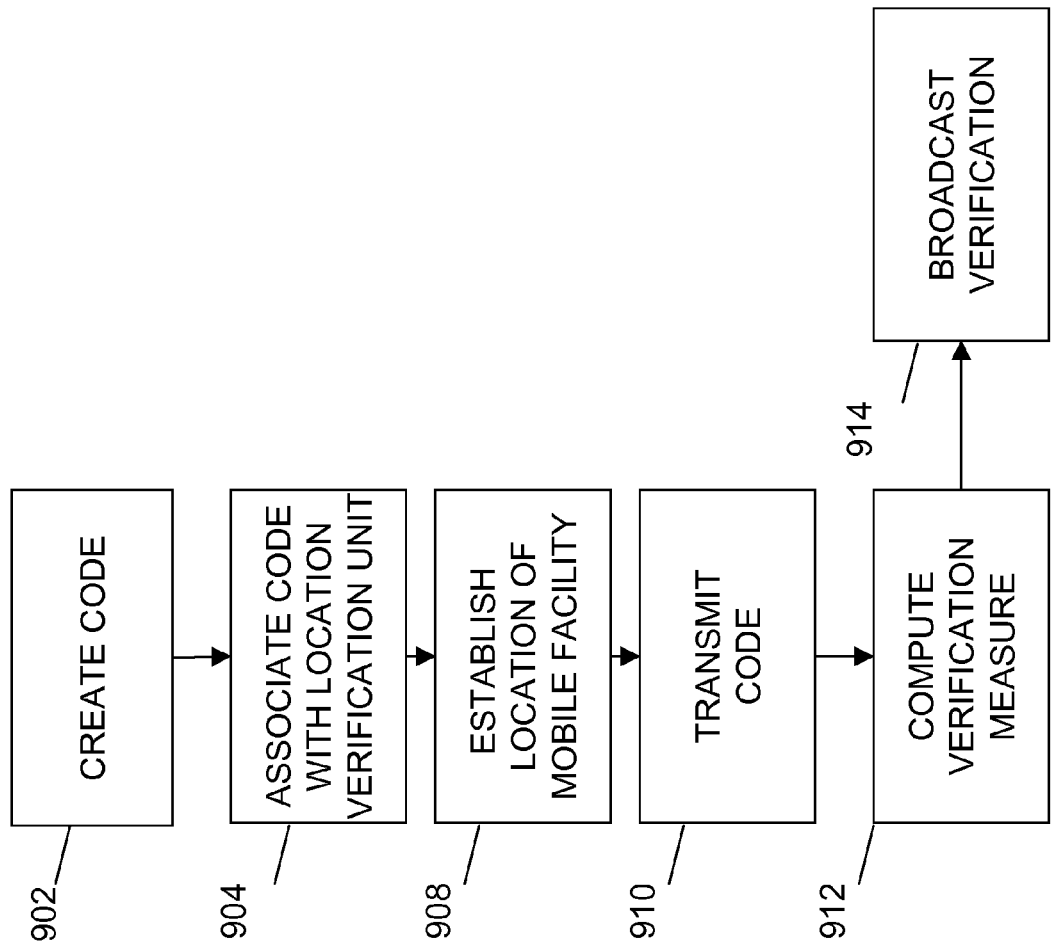
FIG. 9 shows steps in a method for computing a measure based on verification of the presence of a mobile communication facility at a location.

FIG. 9 shows steps in a method for computing a measure based on verification of the presence of a mobile communication facility at a location. This may include at a step 902 creating a code that may be entered in a mobile communication facility; at a step 904 associating the code with a unit of a location verification facility that may be further associated with one or more of a plurality of geographic locations; at a step 908 establishing a geographic location of the mobile communication facility; at a step 910 transmitting the code from the mobile communication facility; at a step 912 computing with the verification facility a location verification measure associated with the geographic location and the mobile communication facility; and at a step 914 broadcasting the measure to a network.

Figure 10:
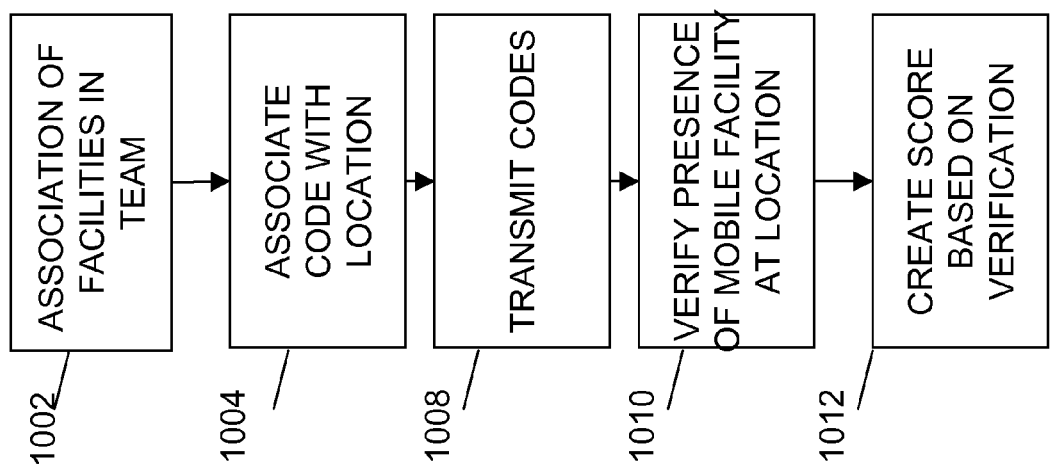
FIG. 10 shows steps in a method for association of a group of mobile communication facilities in a team that is awarded measures based on verification of presence of the mobile communication facilities at locations.

FIG. 10 shows steps in a method for association of a group of mobile communication facilities in a team that is awarded measures based on verification of presence of the mobile communication facilities at locations. The method may include at a step 1002 associating a mobile communication facility with a plurality of mobile communication facilities, wherein the association forms a multiplayer team; at a step 1004 associating a code with a geographic location; at a step 1008 transmitting the code using the mobile communication facility; at a step 1010 identifying whether the mobile communication facility is present at the geographic location near the time of entering the code; and at a step 1012 creating a first multiplayer team score based at least in part on verifying that the mobile communication facility is present at the geographic location near the time of the code transmission.

Figure 11:
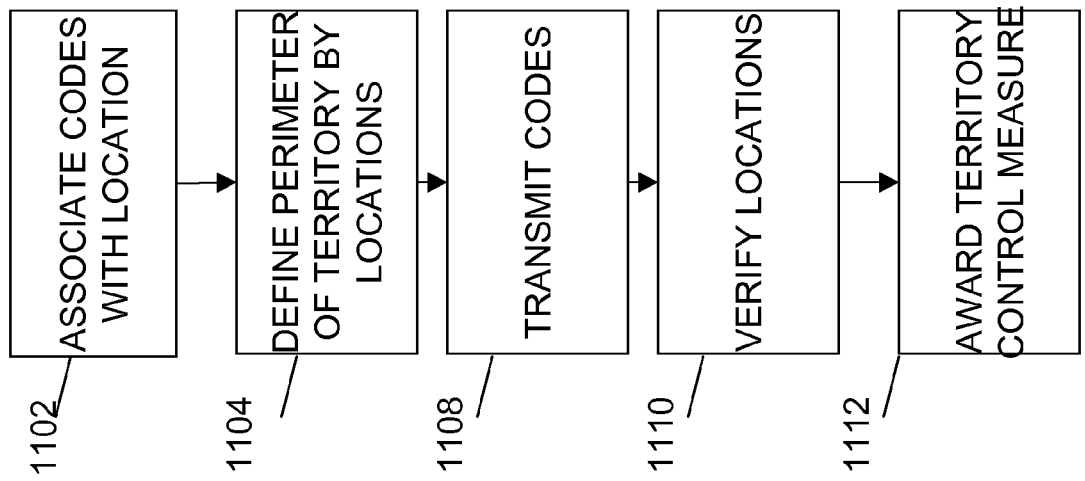
FIG. 11 shows steps in a method for awarding a territory control measure based on verification of presence of mobile communication facilities at locations.

FIG. 11 shows steps in a method for awarding a territory control measure based on verification of presence of mobile communication facilities at locations. The method may include at a step 1102 creating a first code associated with a first location, a second code associated with a second location, and a third code associated with a third location, lines among the three locations defining at a step 1104 at least a portion of a perimeter of a geographic territory; at a step 1108 transmitting the first, second, and third codes using at least one mobile communication facility; at a step 1110 verifying location of the mobile communication facility upon receipt of the codes' transmissions; and at a step 1111 upon verification of at least three codes, awarding a territory control measure for the geographic territory to an entity associated with the mobile communication facility. It may be noted that territories may be triangular, or may represent more complex geometries defined by more than three perimeter points, such as various polygons of various regular or irregular shapes that comprise portions of a geographic map. Thus, a territory, such as a city, may be defined by various regions that are defined by vertices, with the locations of the vertices of a particular region defining points that allow control over that region in a game. Upon verification of location of a mobile communication facility at a vertex, or optionally by some other action, such as entry of a code, entering into a transaction, or the like, the vertex can be awarded to the user or team associated with the mobile communication facility. Once all vertices of a region are awarded, the region itself can be awarded. Such control of regions can be associated with a wide variety of different games, including fantasy role-playing games, territorial "war games", simulation games, or the like.

Figure 12:
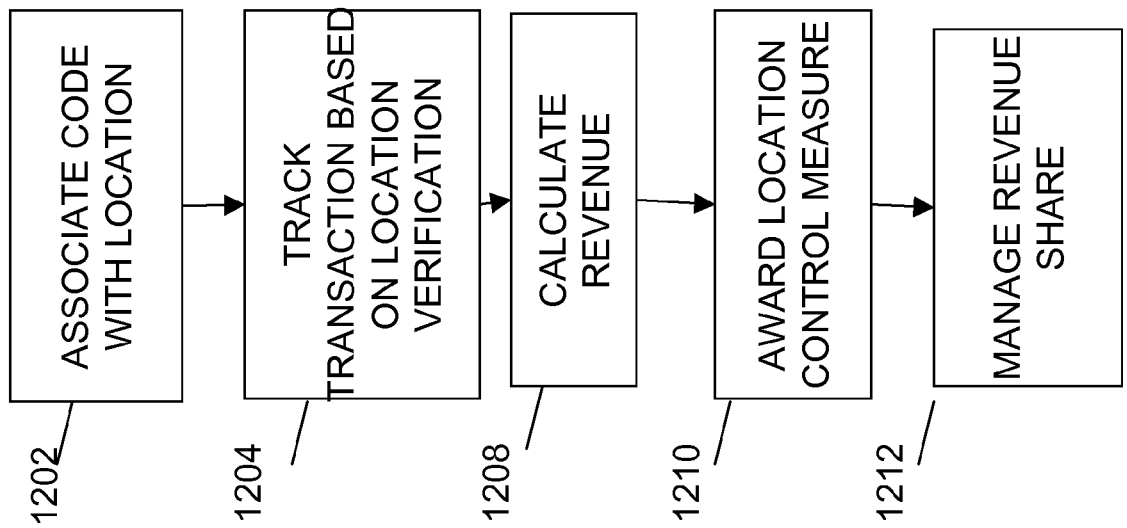
FIG. 12 shows steps in a method for managing revenue shares associated with transactions occurring at locations at which the presence of a mobile communication facility is verified.

FIG. 12 shows steps in a method for managing revenue shares associated with transactions occurring at locations at which the presence of a mobile communication facility is verified. The method may include at a step 1202 associating a code with a geographic location; at a step 1204 tracking a transaction at the geographic location and associating the code with the transaction upon verification of a user's presence at the geographic location; at a step 1208 calculating a revenue associated with the transaction; at a step 1210 awarding a location control measure based on the code and the transaction; and at a step 1214 managing distribution of a share of the revenue associated with the transaction.

The elements depicted in flow charts and block diagrams throughout the figures imply logical boundaries between the elements. However, according to software or hardware engineering practices, the depicted elements and the functions thereof may be implemented as parts of a monolithic software structure, as standalone software modules, or as modules that employ external routines, code, services, and so forth, or any combination of these, and all such implementations are within the scope of the present disclosure. Thus, while the foregoing drawings and description set forth functional aspects of the disclosed systems, no particular arrangement of software for implementing these functional aspects should be inferred from these descriptions unless explicitly stated or otherwise clear from the context.

Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods or processes described above, and steps thereof, may be realized in hardware, software, or any combination of these suitable for a particular application. The hardware may include a general-purpose computer and/or dedicated computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as computer executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

What is claimed is:

1. A method comprising:
creating a first code associated with a first location, a second code associated with a second location, and a third code associated with a third location, lines among the three locations defining at least a portion of a perimeter of a geographic territory;
receiving a transmission of the first, second, and third codes using at least one mobile communication facility;
verifying a location of the at least one mobile communication facility upon receipt of each of the codes' transmissions; and
upon verification of each of the three codes, awarding a territory control measure for the geographic territory to an entity associated with the at least one mobile communication facility.

2. The method of claim 1, wherein upon broadcasting of the verification of each of the three codes, the territory control measure is awarded after the verification is completed.

3. The method of claim 2, wherein the territory control measure is of a multiplayer game.

4. The method of claim 2, wherein the territory control measure is of a multiplayer game.

5. The method of claim 1, further comprising broadcasting the territory control measure to a network.

6. The method of claim 1, further comprising eliminating a rival location control that is associated with a location within the geographic territory upon awarding the territory control measure.

7. The method of claim 6, wherein the rival location control is associated with a rival mobile communication facility in competition for location control with the at least one mobile communication facility.

* * * * *